US012634950B2

(12) United States Patent
Bai et al.

(10) Patent No.: US 12,634,950 B2
(45) Date of Patent: May 19, 2026

(54) DOWNLINK CONTROL INFORMATION (DCI) FORMAT FOR BEAM INDICATION WITHOUT SCHEDULING DATA AND CAPABILITY REPORTING

(71) Applicant: QUALCOMM Incorporated, San Diego, CA (US)

(72) Inventors: Tianyang Bai, Somerville, NJ (US); Yan Zhou, San Diego, CA (US); Fang Yuan, Beijing (CN); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/261,973

(22) PCT Filed: Apr. 12, 2021

(86) PCT No.: PCT/CN2021/086537
§ 371 (c)(1),
(2) Date: Jul. 18, 2023

(87) PCT Pub. No.: WO2022/188235
PCT Pub. Date: Sep. 15, 2022

(65) Prior Publication Data
US 2024/0089977 A1 Mar. 14, 2024

(30) Foreign Application Priority Data
Mar. 12, 2021 (WO) ................ PCT/CN2021/080375

(51) Int. Cl.
*H04W 72/23* (2023.01)
*H04B 7/06* (2006.01)
*H04L 5/00* (2006.01)

(52) U.S. Cl.
CPC ........ *H04W 72/23* (2023.01); *H04B 7/06952* (2023.05); *H04L 5/0053* (2013.01)

(58) Field of Classification Search
CPC ... H04W 72/23; H04B 7/06952; H04L 5/0053
See application file for complete search history.

(56) References Cited

U.S. PATENT DOCUMENTS

| | | | |
|---|---|---|---|
| 11,109,223 | B2 | 8/2021 | Zhou et al. |
| 2019/0141693 | A1 | 5/2019 | Guo et al. |

(Continued)

FOREIGN PATENT DOCUMENTS

| | | |
|---|---|---|
| CN | 110366251 A | 10/2019 |
| CN | 111357230 A | 6/2020 |

(Continued)

OTHER PUBLICATIONS

CATT: "Enhancements on Multi-Beam Operation", 3GPP Draft, 3GPP TSG RAN WG1 #104-e, R1-2100343, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051970946, 17 pages, section 2.2-2.3.

(Continued)

*Primary Examiner* — Ronald B Abelson
(74) *Attorney, Agent, or Firm* — Harrity & Harrity, LLP

(57) ABSTRACT

This disclosure provides systems, methods, and apparatuses that enable a base station (BS) to transmit downlink control information (DCI) without downlink data to indicate a transmission configuration indicator (TCI). In one aspect, a user equipment (UE) may transmit a capability indication associated with whether the UE can receive DCI with a TCI and without a data assignment. The UE may receive DCI with one or more configured fields and without downlink data and may interpret the DCI, based on the one or more (Continued)

configured fields, to identify a TCI. The TCI may be a Type 1 beam indication or another type of beam indication. The DCI may C be a DCI format 1_1 or 1_2 or another DCI format, such as DCI format 1_0 or a DCI scheduling an uplink configuration, among other CN examples, and may indicate another configuration with the TCI.

35 Claims, 13 Drawing Sheets

(56) References Cited

U.S. PATENT DOCUMENTS

| | | | |
|---|---|---|---|
| 2019/0306924 A1 | 10/2019 | Zhang et al. | |
| 2019/0357238 A1 | 11/2019 | Zhou et al. | |
| 2021/0068021 A1 | 3/2021 | Awoniyi-Oteri et al. | |
| 2024/0064768 A1* | 2/2024 | Matsumura | H04L 1/1861 |

FOREIGN PATENT DOCUMENTS

| | | | |
|---|---|---|---|
| CN | 111431685 A | 7/2020 | |
| CN | 111989965 A | 11/2020 | |
| WO | 2019236197 A1 | 12/2019 | |
| WO | 2020263037 A1 | 12/2020 | |
| WO | 2021029714 A1 | 2/2021 | |
| WO | 2022153493 A1 | 7/2022 | |

OTHER PUBLICATIONS

MediaTek Inc: "Enhancement on Multi-Beam Operation", 3GPP Draft, 3GPP TSG RAN WG1 #104-e, R1-2100588, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb 5, 2021, Jan. 19, 2021, XP051971059, 27 pages, p. 5, p. 9, p. 11, p. 14, Section 232, Section 2.3.3, Section 2.1.7, Section 2.3.4, Section 2.3.1, Section 28.

Moderator (Samsung): "Moderator Summary#4 for Multi-Beam Enhancement: Round 2B", 3GPP Draft, 3GPP TSG RAN WG1 #104-e, R1-2101969, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 2, 2021, XP051976038, 23 pages, Jan. 14, 2025, The Whole Document.

SONY: "Further Enhancement on Multi-Beam Operation", 3GPP TSG RAN WG1#104e, R1-2100844, E-meeting, Jan. 25, 2021-Feb. 5, 2021, Jan. 19, 2021, 18 Pages.

Supplementary European Search Report—EP21929707—Search Authority—the Hague—Jan. 9, 2025.

Intel Corporation: "Remaining Issues on SCell Dormancy behavior", R1-2002013, 3GPP TSG RAN WG1 Meeting #100bis_e, Apr. 30, 2020 (Apr. 30, 2020), 10 Pages, Section 3.

International Search Report and Written Opinion—PCT/CN2021/080375—ISA/EPO—Dec. 8, 2021.

International Search Report and Written Opinion—PCT/CN2021/086537—ISA/EPO—Dec. 2, 2021.

Nokia, et al., "Remaining Issues on Efficient CA Design", R1-2000504, 3GPP TSG RAN WG1 Meeting #100e, Feb. 28, 2020 (Feb. 28, 2020), 6 Pages, The Whole document.

ZTE: "Draft 38.213 CR on HARQ-ACK for SCell Dormancy Indication", 3GPP Draft, 3GPP TSG-RAN WG1 Meeting # 103-e, R1-200xxxx (R1-2007737), e-Meeting, Oct. 26-Nov. 13, 2020, pp. 1-18, Sections 9 and 10.1.

* cited by examiner

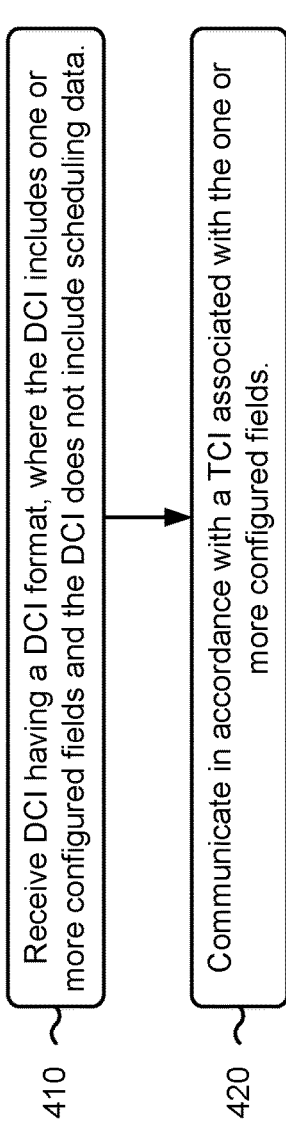
Receive DCI having a DCI format, where the DCI includes one or more configured fields and the DCI does not include scheduling data.
410
Communicate in accordance with a TCI associated with the one or more configured fields.
420
400
FIGURE 4

510 Transmit DCI having a DCI format, where the DCI includes one or more configured fields and the DCI does not include scheduling data.

520 Communicate in accordance with a TCI associated with the one or more configured fields.

500

| | SPS/UL Type2 release | SPS/UL Type2 activation | Type3 HARQ request | Scell Dormancy |
|---|---|---|---|---|
| DCI format | UL: 0_0, 0_1, 0_2; DL: 1_0, 1_1, 1_2 | | 1_1 | 1_1, (2_6) |
| RNTI | CS-RNTI | | C-RNTI, MCSC-RNTI | C-RNTI, MCSC-RNTI, (PS RNTI) |
| One-shot HARQ request | | | '1' | U/A or '0' [Note 1] |
| FDRA | All '0' or '1' [Note 3] | [Note 2] | All '0' or '1' | All '0' or '1' |
| MCS (of TB1) | All '0' | [Note 2] | | [Note 5] |
| NDI (of TB1) | '0' | '0' | | |
| RV (of TB1) | '0' | '0' | | |
| HARQ process ID | | | | |
| Antenna port | | | | |
| DMRS sequence | | | | |
| DFI (if present) | '0' [Note 4] | '0' | | |

Information field
Validation field
Reserved bits for the purpose

Note: [1]UE doesn't expect a DCI to indicate more than 1 purpose
[2] Cannot put the same sequence used by SPS release
[3] Based on resource allocation type
[4] To distinguish from the DCI 0_1 used as ACK to UL Type 2 PUSCH
[5] Use to indicate cell group bit maps

FIGURE 8

Activation

| DCI format | SPS/ UL Type2 release | SPS/ UL Type2 activation | Type3 HARQ request | Scell Dormancy |
|---|---|---|---|---|
| | UL: 0_0, 0_1, 0_2; DL: 1_0, 1_1, 1_2 | | 1_1 | 1_1, (2_6) |
| RNTI | CS-RNTI | | C-RNTI, MCS-C-RNTI | C-RNTI, MCS-C-RNTI, (PS-RNTI) |

Release

| | DCI format 0_0/0_1/0_2 | DCI format 1_0/1_1/1_2 | DCI format 1_1 |
|---|---|---|---|
| Redundancy version | set to all '0's | set to all '0's | For the enabled transport block: set to all '0's |

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with $\mu = 1$; set to all '1's, otherwise | set to all '0's for FDRA Type 0 or for dynamicSwitch; set to all '1's for FDRA Type 1 |

FIGURE 9

Legend:
- Information Field (hatched)
- Validation Field (gray)
- Unused Field (black)

|  | SPS/UL Type2 release | SPS/UL Type2 activation | Type3 HARQ request | Scell Dormancy |
|---|---|---|---|---|
| DCI format | UL: 0_0, 0_1, 0_2; DL: 1_0, 1_1, 1_2 | | 1_1 | 1_1 |
| RNTI | CS-RNTI | | C-RNTI, MCS-C-RNTI | |
| One-shot HARQ request | | | | U/A or '0' |
| FDRA | All '0' or '1' | | All '0' or '1' | All '0' or '1' |
| MCS (of TB1) | All '0' | | | |
| NDI (of TB1) | '0' | '0' | | |
| RV (of TB1) | '0' | '0' | | |
| HARQ | | | | |
| Antenna port | | | | |
| DMRS sequence init. | | | | |

1110 — Transmit a capability indicator, where the capability indicator is associated with whether the UE supports DCI having a DCI format 1120 — Communicate in accordance with the capability indicator

1100

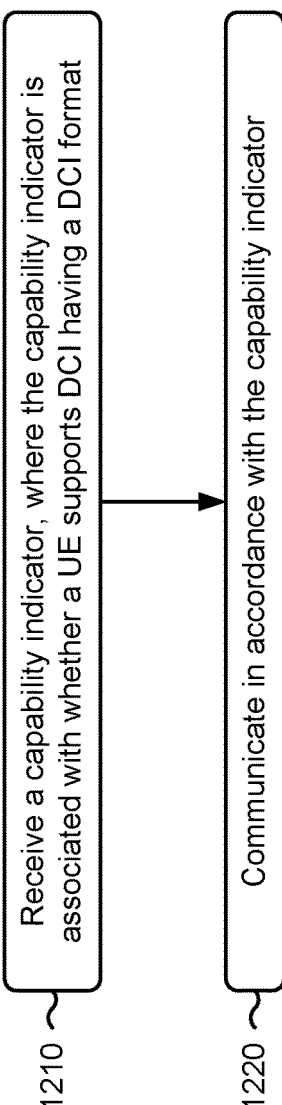
1210 Receive a capability indicator, where the capability indicator is associated with whether a UE supports DCI having a DCI format
1220 Communicate in accordance with the capability indicator
1200
FIGURE 12

DOWNLINK CONTROL INFORMATION (DCI) FORMAT FOR BEAM INDICATION WITHOUT SCHEDULING DATA AND CAPABILITY REPORTING

CROSS-REFERENCE TO RELATED APPLICATIONS

This Patent Application is a 371 National Phase of PCT/CN2021/086537, filed Apr. 12, 2021, entitled "DOWN-LINK CONTROL INFORMATION (DCI) FORMAT FOR BEAM INDICATION WITHOUT SCHEDULING DATA AND CAPABILITY REPORTING," and claims priority to PCT Patent Application No. PCT/CN2021/080375, filed on Mar. 12, 2021, entitled "DOWNLINK CONTROL INFOR-MATION (DCI) FORMAT FOR BEAM INDICATION WITHOUT SCHEDULING DATA," and assigned to the assignee hereof. The disclosure of the prior Applications are considered part of and are incorporated by reference into this Patent Application.

TECHNICAL FIELD

Aspects of the present disclosure relate generally to wireless communication and to techniques for downlink control information (DCI) format for beam indication without scheduling data and capability reporting.

DESCRIPTION OF THE RELATED TECHNOLOGY

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier fre-quency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile stan-dard promulgated by the Third Generation Partnership Proj-ect (3GPP).

A wireless network may include a number of base stations (BSs) that can support communication for a number of user equipment (UEs). A UE may communicate with a BS via the downlink (DL) and uplink (UL). "DL" (or "forward link") refers to the communication link from the BS to the UE, and "UL" (or "reverse link") refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to commu-nicate on a municipal, national, regional, and even global level. NR, which also may be referred to as 5G, is a set of enhancements to the LTE mobile standard promulgated by the 3GPP. NR is designed to better support mobile broad-band Internet access by improving spectral efficiency, low-ering costs, improving services, making use of new spec-trum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equip-ment (UE) includes receiving downlink control information (DCI) having a DCI format, where the DCI includes one or more configured fields, and where the DCI does not include scheduling data; and communicating in accordance with a transmission control indicator (TCI) associated with the one or more configured fields.

In some aspects, the DCI format is DCI format 1_1 or DCI format 1_2. In some aspects, the DCI format is a DCI format 1_0 or an uplink DCI format. In some aspects, the DCI includes a first indication of the TCI and a second indication of another setting. In some aspects, the second indication includes at least one of: a secondary cell (SCell) dormancy indication, a semi-persistent scheduling (SPS) release indi-cation, an SPS activation indication, or a hybrid automatic repeat request (HARQ) indication. In some aspects, the DCI indicates a plurality of TCIs. In some aspects, the TCI includes a downlink TCI and an uplink TCI.

Another innovative aspect of the subject matter described in this disclosure can be implemented in a method of wireless communication performed by a base station (BS) includes transmitting DCI having a DCI format, where the DCI includes one or more configured fields, and where the DCI does not include scheduling data; and communicating in accordance with a TCI associated with the one or more configured fields.

Another innovative aspect of the subject matter described in this disclosure can be implemented in an apparatus for wireless communication at a UE that includes a memory, and one or more processors, coupled to the memory, con-figured to: receive DCI having a DCI format, where the DCI includes one or more configured fields, and where the DCI does not include scheduling data; and communicate in accordance with a TCI associated with the one or more configured fields.

Another innovative aspect of the subject matter described in this disclosure can be implemented in an apparatus for wireless communication at a BS that includes a memory, and one or more processors, coupled to the memory, configured to: transmit DCI having a DCI format, where the DCI includes one or more configured fields, and where the DCI does not include scheduling data; and communicate in accordance with a TCI associated with the one or more configured fields.

Another innovative aspect of the subject matter described in this disclosure can be implemented in an apparatus of a UE for wireless communication that includes a first interface configured to obtain DCI having a DCI format, where the DCI includes one or more configured fields, and where the DCI does not include scheduling data; and the first interface or a second interface is configured to obtain or output information in accordance with a TCI associated with the one or more configured fields.

Another innovative aspect of the subject matter described in this disclosure can be implemented in an apparatus of a BS for wireless communication that includes a first interface configured to output DCI having a DCI format, where the DCI includes one or more configured fields, and where the DCI does not include scheduling data; and the first interface or a second interface is configured to output or obtain information in accordance with a TCI associated with the one or more configured fields.

Another innovative aspect of the subject matter described in this disclosure can be implemented in a non-transitory computer-readable medium storing a set of instructions for wireless communication that includes one or more instructions that, when executed by one or more processors of a UE, cause the user equipment to: receive DCI having a DCI format, where the DCI includes one or more configured fields, and where the DCI does not include scheduling data; and communicate in accordance with a TCI associated with the one or more configured fields.

Another innovative aspect of the subject matter described in this disclosure can be implemented in a non-transitory computer-readable medium storing a set of instructions for wireless communication includes one or more instructions that, when executed by one or more processors of a BS, cause the BS to: transmit DCI having a DCI format, where the DCI includes one or more configured fields, and where the DCI does not include scheduling data; and communicate in accordance with a TCI associated with the one or more configured fields.

Another innovative aspect of the subject matter described in this disclosure can be implemented in an apparatus for wireless communication that includes means for receiving DCI having a DCI format, where the DCI includes one or more configured fields, and where the DCI does not include scheduling data; and means for communicating in accordance with a TCI associated with the one or more configured fields.

Another innovative aspect of the subject matter described in this disclosure can be implemented in an apparatus for wireless communication that includes means for transmitting DCI having a DCI format, where the DCI includes one or more configured fields, and where the DCI does not include scheduling data; and means for communicating in accordance with a TCI associated with the one or more configured fields.

Another innovative aspect of the subject matter described in this disclosure can be implemented in a method of wireless communication performed by an apparatus of a UE includes transmitting a capability indicator, where the capability indicator is associated with whether the UE supports DCI having a DCI format, where the DCI format includes one or more configured fields, and where the DCI format does not include scheduling data; and communicating in accordance with the capability indicator.

Another innovative aspect of the subject matter described in this disclosure can be implemented in a method of wireless communication performed by a BS includes receiving a capability indicator, where the capability indicator is associated with whether a UE supports DCI having a DCI format, where the DCI format includes one or more configured fields, and where the DCI format does not include scheduling data; and communicating in accordance with the capability indicator.

In some aspects, wherein the one or more configured fields are associated with a TCI. In some aspects, the method includes receiving the DCI having the DCI format and communicating in accordance with a TCI associated with the one or more configured fields.

Another innovative aspect of the subject matter described in this disclosure can be implemented in an apparatus for wireless communication at a UE that includes a memory, and one or more processors, coupled to the memory, configured to transmit a capability indicator, where the capability indicator is associated with whether the UE supports DCI having a DCI format, where the DCI format includes one or more configured fields, and where the DCI format does not include scheduling data; and communicate in accordance with the capability indicator.

In some aspects, wherein the one or more configured fields are associated with a TCI. In some aspects, the method includes transmitting the DCI having the DCI format and communicating in accordance with a TCI associated with the one or more configured fields.

Another innovative aspect of the subject matter described in this disclosure can be implemented in a BS that includes a memory, and one or more processors, coupled to the memory, configured to receive a capability indicator, where the capability indicator is associated with whether a UE supports DCI having a DCI format, where the DCI format includes one or more configured fields, and where the DCI format does not include scheduling data; and communicate in accordance with the capability indicator.

Another innovative aspect of the subject matter described in this disclosure can be implemented in an apparatus of a UE for wireless communication that includes a first interface configured to output a capability indicator, where the capability indicator is associated with whether the UE supports DCI having a DCI format, where the DCI format includes one or more configured fields, and where the DCI format does not include scheduling data; and the first interface to or a second interface configured to communicate in accordance with the capability indicator.

Another innovative aspect of the subject matter described in this disclosure can be implemented in an apparatus of a BS for wireless communication that includes a first interface configured to receive a capability indicator, where the capability indicator is associated with whether a UE supports DCI having a DCI format, where the DCI format includes one or more configured fields, and where the DCI format does not include scheduling data; and a second interface or the first interface configured to communicate in accordance with the capability indicator.

Another innovative aspect of the subject matter described in this disclosure can be implemented in a non-transitory computer-readable medium storing a set of instructions for wireless communication that includes one or more instructions that, when executed by one or more processors of a UE, cause the UE to transmit a capability indicator, where the capability indicator is associated with whether the UE supports DCI having a DCI format, where the DCI format includes one or more configured fields, and where the DCI format does not include scheduling data; and communicate in accordance with the capability indicator.

Another innovative aspect of the subject matter described in this disclosure can be implemented in a non-transitory computer-readable medium storing a set of instructions for wireless communication includes one or more instructions that, when executed by one or more processors of a BS, cause the BS to receive a capability indicator, where the capability indicator is associated with whether a UE supports DCI having a DCI format, where the DCI format includes one or more configured fields, and where the DCI format does not include scheduling data; and communicate in accordance with the capability indicator.

Another innovative aspect of the subject matter described in this disclosure can be implemented in an apparatus for wireless communication that includes means for transmitting a capability indicator, where the capability indicator is associated with whether the UE supports DCI having a DCI format, where the DCI format includes one or more configured fields, and where the DCI format does not include scheduling data; and means for communicating in accordance with the capability indicator.

Another innovative aspect of the subject matter described in this disclosure can be implemented in an apparatus for wireless communication that includes means for receiving a capability indicator, where the capability indicator is associated with whether a UE supports DCI having a DCI format, where the DCI format includes one or more configured fields, and where the DCI format does not include scheduling data; and means for communicating in accordance with the capability indicator.

In some aspects, the apparatus of the UE, such as a processing system of the apparatus or one or more interfaces of the apparatus, among other examples, may be configured to perform one or more operations of the method of wireless communication performed by the apparatus.

In some aspects, the apparatus of the BS, such as a processing system of the apparatus or one or more interfaces of the apparatus, among other examples, may be configured to perform one or more operations of the method of wireless communication performed by the apparatus.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 4 and 5 are diagrams illustrating example processes performed, for example, by a UE or a BS.

FIGS. 8-10 are diagrams associated with example aspects of the present disclosure.

FIGS. 11 and 12 are diagrams illustrating example processes performed, for example, by a UE or a BS.

6

Figure 13:
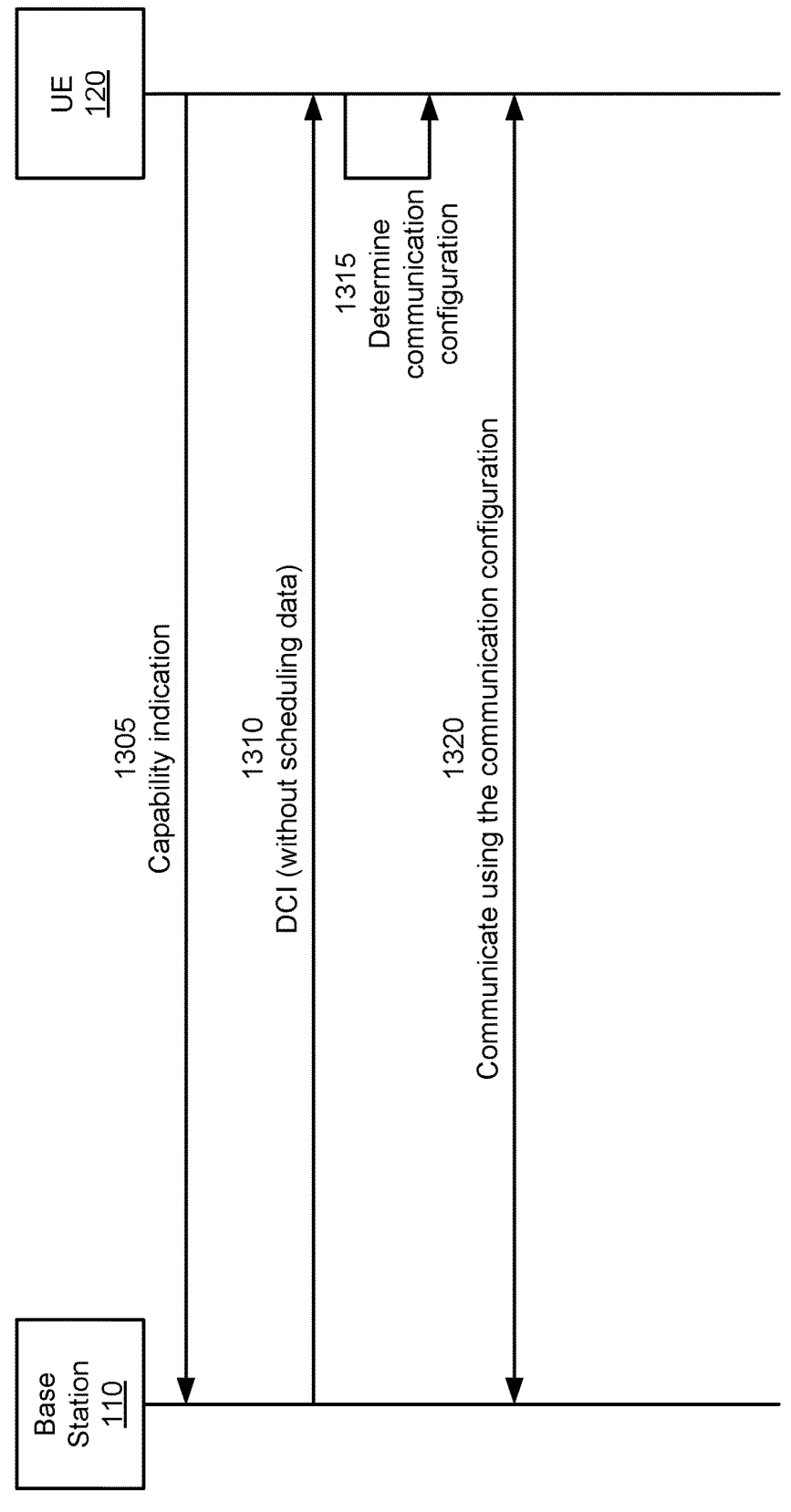

FIG. 13 is a diagram associated with example aspects of the present disclosure.

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth© standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some situations, a base station (BS) may transmit downlink control information (DCI) to provide configuration information to a user equipment (UE). For example, the BS may transmit DCI to indicate a semi-persistent scheduling (SPS) release, an SPS activation, a hybrid automatic repeat request (HARQ) configuration, or a secondary cell dormancy configuration, among other examples. The BS also may transmit DCI to update a beam configuration for the UE. For example, the BS may transmit DCI, configured in DCI format 1_1 or DCI format 1_2, with a downlink resource assignment for scheduling a downlink data transmission to indicate a transmission configuration indicator (TCI), such as a TCI-State, as defined in 3GPP specifications, or another similar data structure. The TCI may indicate one or more quasi-co-location (QCL) rules, where a rule associates a reference signal (for example, a synchronization signal, such as a synchronization signal block (SSB), a channel state information (CSI) reference signal (CSI-RS), a positioning reference signal (PRS), or other reference signal) with an associated channel property (for example, a Doppler shift, a Doppler spread, an average delay, a delay spread, one or more spatial parameters, such as a spatial filter, or other properties). Such QCL rules may include QCL-TypeA, QCL-TypeB, QCL-TypeC, or QCL-TypeD data structures as defined by the 3GPP specifications.

One type of TCI is a joint downlink and uplink TCI (Type 1 beam indication), which indicates a common beam for at least one downlink channel or reference signal and at least one uplink channel or reference signal. Other types of TCIs may include a separate downlink common TCI (Type 2 beam indication), which indicates a common beam for multiple downlink channels or reference signals, or a separate uplink common TCI (Type 3 beam indication), which indicates a common beam for multiple uplink channels or reference signal; a separate downlink single channel TCI (Type 4 beam indication), which may indicate a beam for a single downlink channel or reference signal; a separate uplink single channel TCI (Type 5 beam indication), which may indicate a beam for a single uplink channel or reference signal; or uplink spatial relationship information (SRI) (Type 6 beam indication), which may indicate a beam for a single uplink channel or reference signal. Other types of TCIs are possible and may be defined in a standard (such as the 3GPP specifications).

When the BS transmits DCI scheduling a downlink data transmission to indicate a TCI, the DCI may be a DCI format 1_1 or DCI format 1_2 to indicate, for example, a Type 1 beam indication (the joint downlink and uplink TCI). Some aspects described herein may define one or more interpretation rules, such that a BS may transmit DCI without downlink data to indicate a TCI. For example, a UE may receive DCI with one or more configured fields and without downlink data and may interpret the DCI, based on the one or more configured fields, to identify a TCI. In such examples, the TCI may be a Type 1 beam indication or another type of beam indication. Additionally, in such examples, the DCI may be a DCI format 1_1 or DCI format 1_2 or another DCI format, such as DCI format 1_0 or a DCI scheduling an uplink configuration, among other examples, and may indicate another configuration with the TCI, such as an SPS release, an SPS activation, a HARQ configuration, or a secondary cell dormancy configuration, among other examples. Some aspects described herein may enable a UE to provide a capability report regarding whether a UE supports receiving a DCI without downlink data to indicate a TCI. For example, a UE may indicate support for DCI format 1_1 or DCI format 1_2 by transmitting a capability indicator.

Particular implementations of the subject matter described in this disclosure can be implemented to realize one or more of the following potential advantages. As described herein, a UE may receive DCI that does not schedule data transmission and may communicate in accordance with a TCI associated with one or more configured fields of the DCI. Use of a DCI to identify a TCI, without scheduling data transmission, may enable a reduction in signaling overhead relative to having information scheduling data transmission to be included in a DCI that identifies a TCI. Enabling use of different types of beam indications in the TCI in the DCI may enable a unified TCI framework that may simplify a beam management procedure for not only downlink and uplink channels but also for data and control channels in 3GPP (NR) systems. Including an explicit beam indication, such as a TCI, in a DCI may enhance flexibility for signaling, such as when DCI is being transmitted to indicate another configuration, such as an SPS release, an SPS activation, a HARQ configuration, or a secondary cell dormancy configuration, among other examples. Providing a capability indicator to indicate whether a UE supports a DCI without downlink data to indicate a TCI avoids a scenario where a BS transmits a DCI without downlink data to indicate a TCI and the UE is unable to interpret such a DCI. Avoiding the aforementioned scenario may reduce a likelihood of communication errors from UEs that cannot interpret such a DCI and enable a BS to operate in communication systems that include UEs with different capabilities.

Figure 1:
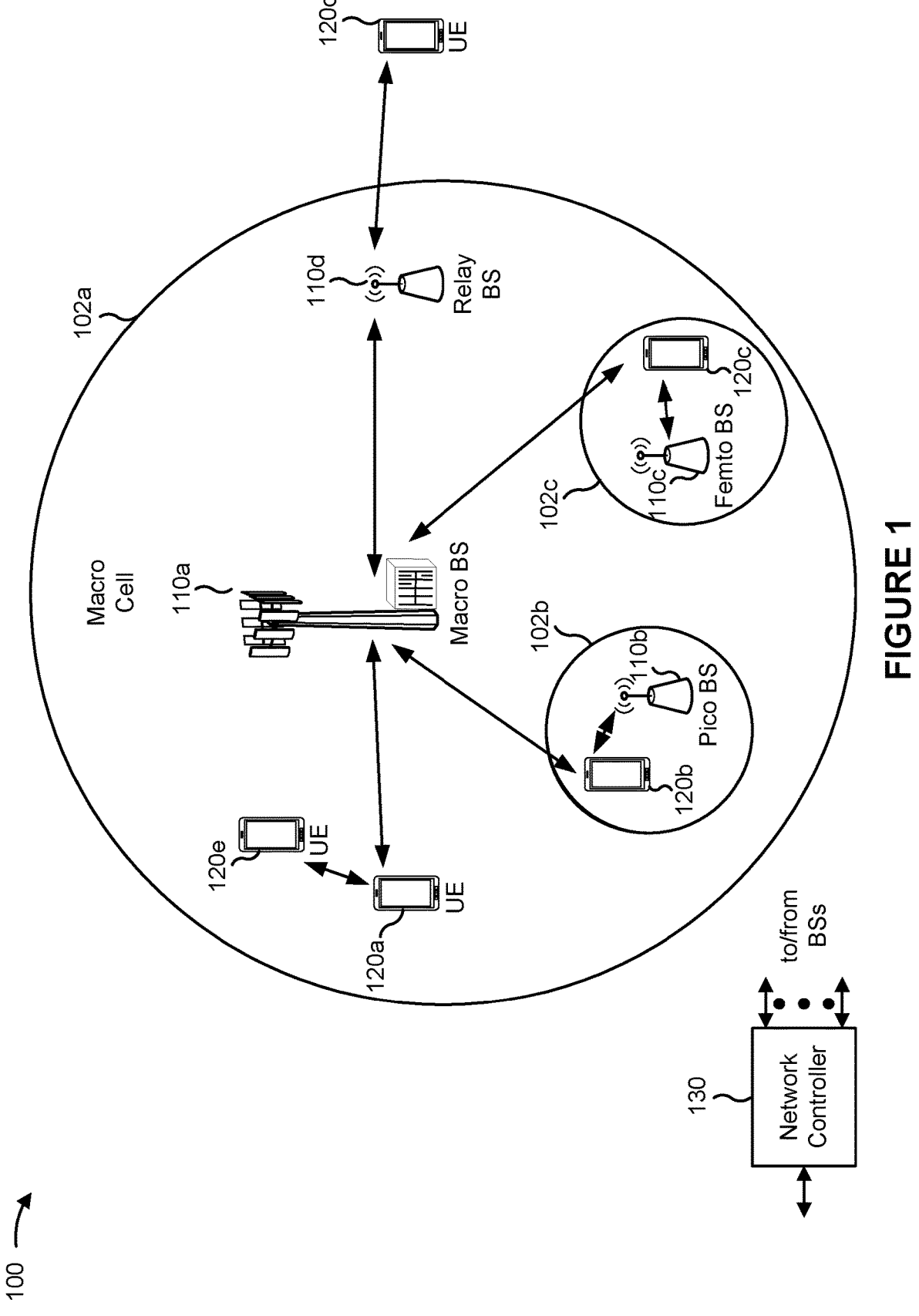
FIG. 1 is a diagram illustrating an example of a wireless network.

FIG. 1 is a diagram illustrating an example of a wireless network 100. The wireless network 100 may be or may include elements of a 5G (NR) network, an LTE network, or another type of network. The wireless network 100 may include one or more base stations 110 (shown as BS 110a, BS 110b, BS 110c, and BS 110d) and other network entities. A base station (BS) is an entity that communicates with user equipment (UEs) and also may be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof, using any suitable transport network.

The wireless network 100 may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay BS 110d may communicate with a macro BS 110a and a UE 120d in order to facilitate communication between the macro BS 110a and the UE 120d. A relay BS also may be referred to as a relay station, a relay base station, a relay, etc.

The wireless network 100 may be a heterogeneous network that includes BSs of different types, such as macro BSs, pico BSs, femto BSs, or relay BSs, among other examples. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or a similar protocol), or a mesh network. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
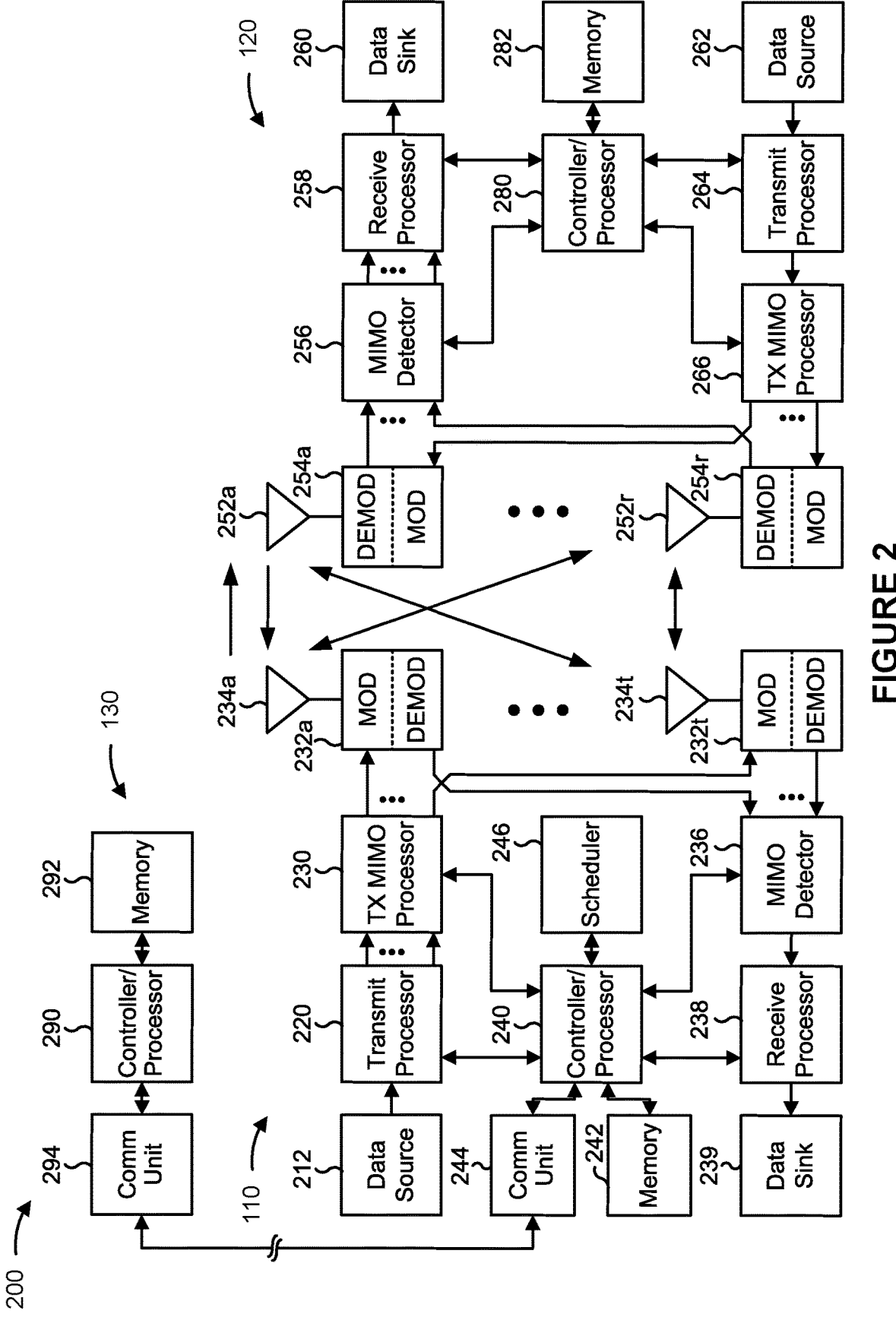
FIG. 2 is a diagram illustrating an example of a base station (BS) in communication with a user equipment (UE) in a wireless network.

FIG. 2 is a diagram illustrating an example 200 of a base station (BS) 110 in communication with a UE 120 in a wireless network 100. The base station 110 may be equipped with T antennas 234a through 234t, and the UE 120 may be equipped with R antennas 252a through 252r, where in general $T \geq 1$ and $R \geq 1$.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information) and control information (for example, CQI requests, grants, or upper layer signaling) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the base station 110 or other base stations and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at the UE 120, a transmit processor 264 may receive and process data from a data source 262 and control information (for example, for reports including RSRP, RSSI, RSRQ, or CQI) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM or CP-OFDM), and transmitted to the base station 110. In some aspects, a modulator and a demodulator (for example, MOD/DEMOD 254) of the UE 120 may be included in a modem of the UE 120. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The base station 110 may include a scheduler 246 to schedule one or more UEs 120 for downlink communications, uplink communications, or a combination thereof. In some aspects, a modulator and a demodulator (for example, MOD/DEMOD 232) of the base station 110 may be included in a modem of the base station 110. In some aspects, the base station 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, "processing system of the base station 110" may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface to receive or obtain information, and a second interface to output, transmit or provide information. In some cases, "first interface" may refer to an interface between the processing system of the chip or modem and a receiver, such that the base station 110 may receive information or signal inputs, and the information may be passed to the processing system. In some cases, "second interface" may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with using a DCI for beam indication without scheduling data and one or more techniques associated with capability reporting, as described in more detail elsewhere herein. The controller/processor 240 of the base station 110, the controller/processor 280 of the UE 120, or any other component(s) (or combinations of components) of FIG. 2 may perform or direct operations of, for example, process 400 of FIG. 4, process 500 of FIG. 5, process 1100 of FIG. 11, process 1200 of FIG. 12, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. The one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 400 of FIG. 4, process 500 of FIG. 5, process 1100 of FIG. 11, process 1200 of FIG. 12, or other processes as described herein.

In some aspects, the UE 120 may include means for transmitting DCI having a DCI format, the DCI includes one or more configured fields, and the DCI does not include scheduling data, means for communicating in accordance with a TCI associated with the one or more configured fields, means for transmitting a capability indicator, where the capability indicator is associated with whether the UE supports DCI having a DCI format, where the DCI format includes one or more configured fields, and where the DCI format does not include scheduling data, or means for communicating in accordance with the capability indicator, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

In some aspects, the base station 110 may include means for transmitting DCI having a DCI format, the DCI includes one or more configured fields, and the DCI does not include scheduling data, means for communicating in accordance with a TCI associated with the one or more configured fields, means for receiving a capability indicator, where the capability indicator is associated with whether a UE supports DCI having a DCI format, where the DCI format includes one or more configured fields, and where the DCI format does not include scheduling data, or means for communicating in accordance with the capability indicator, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
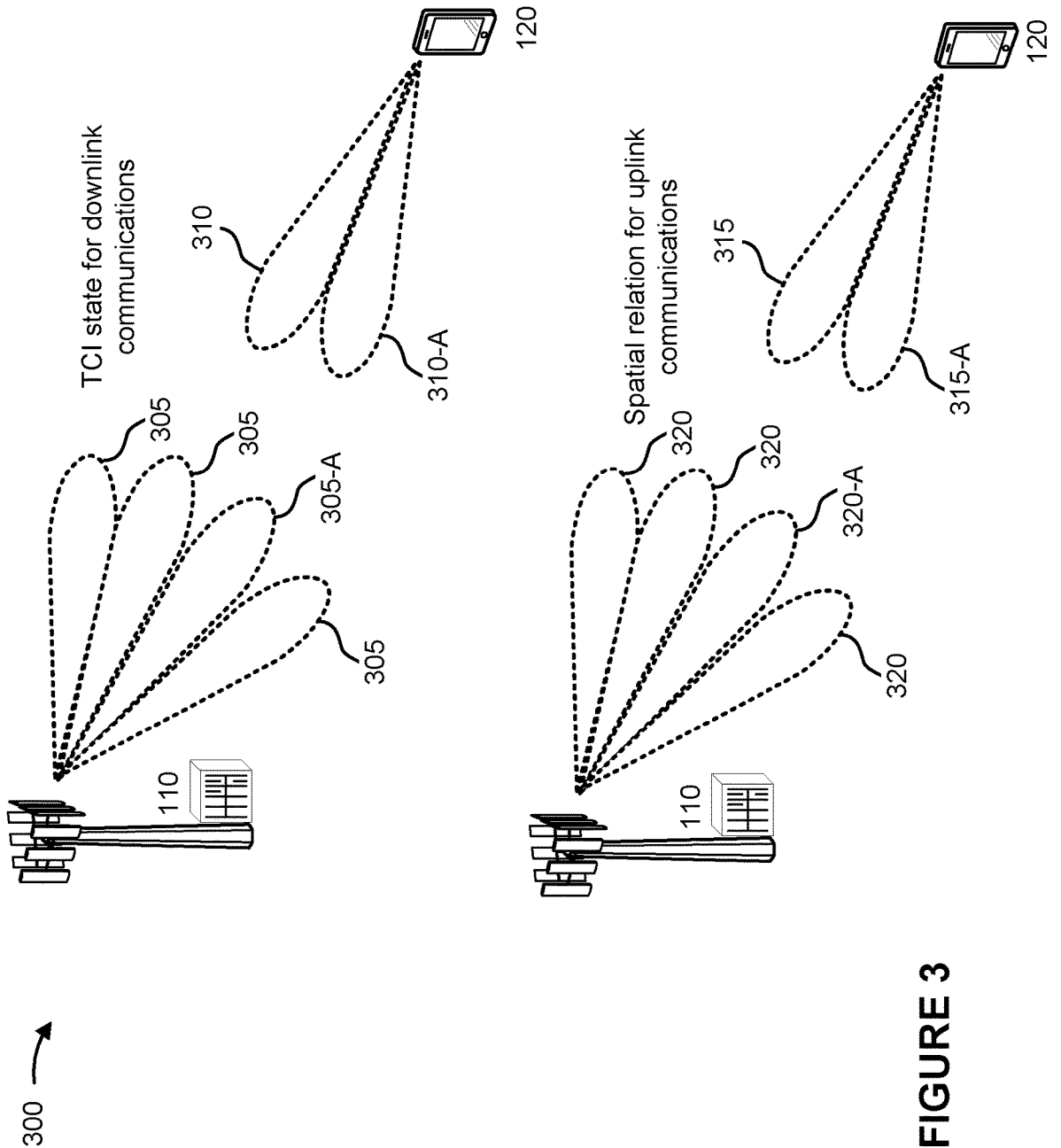
FIG. 3 is a diagram illustrating an example of using beams for communications between a BS and a UE.

FIG. 3 is a diagram illustrating an example 300 of using beams for communications between a base station (BS) and a UE. As shown in FIG. 3, a base station 110 and a UE 120 may communicate with one another.

The base station 110 may transmit to UEs 120 located within a coverage area of the base station 110. The base station 110 and the UE 120 may be configured for beam-formed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with an SSB, and the UE 120 may indicate a BS transmit beam 305 by transmitting uplink transmissions in resources of the SSB that are associated with the BS transmit beam 305. A particular SSB may have an associated TCI state (for example, for an antenna port or for beamforming). The base station 110 may, in some examples, indicate a downlink BS transmit beam 305 based on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 also may maintain a set of activated TCI states for receiving the downlink shared channel transmissions and the CORESET transmissions. If a TCI state is activated for the UE 120, the UE 120 may have one or more antenna configurations based on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described herein.

FIG. 4 is a diagram illustrating an example process 400 performed, for example, by an UE. The process 400 is an example where the UE (for example, UE 120) performs operations associated with using a DCI for beam indication without scheduling data.

As shown in FIG. 4, in some aspects, the process 400 may include receiving DCI having a DCI format, where the DCI includes one or more configured fields and the DCI does not include scheduling data (block 410). For example, the UE (such as by using reception component 602, depicted in FIG. 6) may receive DCI having a DCI format, where the DCI includes one or more configured fields, and the DCI does not include scheduling data, as described herein. In some aspects, the UE may include a first interface configured to obtain DCI having a DCI format.

As shown in FIG. 4, in some aspects, the process 400 may include communicating in accordance with a TCI associated with the one or more configured fields (block 420). For example, the UE (such as by using reception component 602 or transmission component 604, depicted in FIG. 6) may communicate in accordance with a TCI associated with the one or more configured fields, as described herein. In some aspects, the UE may include the first interface or a second interface configured to obtain or output information in accordance with the TCI.

The process 400 may include additional aspects, such as any single aspect or any combination of aspects described below or in connection with one or more other processes described elsewhere herein.

In a first additional aspect, the DCI format is DCI format 1_1 or DCI format 1_2.

In a second additional aspect, the DCI includes an indication of the TCI and does not include another type of indication.

In a third additional aspect, the DCI format is a DCI format 1_0 or an uplink DCI format.

In a fourth additional aspect, the DCI includes a first indication of the TCI and a second indication of another setting.

In a fifth additional aspect, the second indication includes at least one of a secondary cell dormancy indication, a semi-persistent scheduling release indication, a semi-persistent scheduling activation indication, or a hybrid automatic repeat request indication.

In a sixth additional aspect, the TCI is based on a value for a TCI field parameter of the DCI.

In a seventh additional aspect, the TCI is based on a value for a non-TCI field parameter of the DCI.

In an eighth additional aspect, the TCI is based on one or more CORESET beams of the DCI.

In a ninth additional aspect, the DCI indicates a single TCI and the TCI is associated with a TCI pool, and the process 400 further includes configuring multiple TCIs associated with the TCI pool based on the TCI.

In a tenth additional aspect, the DCI indicates multiple TCIs.

In an eleventh additional aspect, the DCI includes a TCI field indicating an identifier of a set of TCIs.

In a twelfth additional aspect, the set of TCI is a single configured grouping of TCIs or a group of TCIs, selected from multiple configured groupings of TCIs, with a common attribute.

In a thirteenth additional aspect, the TCI includes a downlink TCI and an uplink TCI.

In a fourteenth additional aspect, the TCI is based on a radio network temporary identifier (RNTI) associated with the DCI.

In a fifteenth additional aspect, the TCI is based on a mandatory field of the DCI.

In a sixteenth additional aspect, the TCI is based on a validation sequence configured for beam indication.

In a seventeenth additional aspect, the TCI is based on a value of a validation sequence associated with a non-TCI configuration.

In an eighteenth additional aspect, the process 400 further includes transmitting a capability indicator, where the capability indicator is associated with whether the UE supports DCI having a DCI format, where the DCI format includes one or more configured fields, and where the DCI format does not include scheduling data, and communicating in accordance with the capability indicator.

In a nineteenth additional aspect, a configured field associated with the TCI is not present in the one or more configured fields of the DCI, and the UE is configured to determine the TCI based on at least one of another DCI, another indicator that is not a DCI, another configured field that is present in the one or more configured fields of the DCI, or a default configuration.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
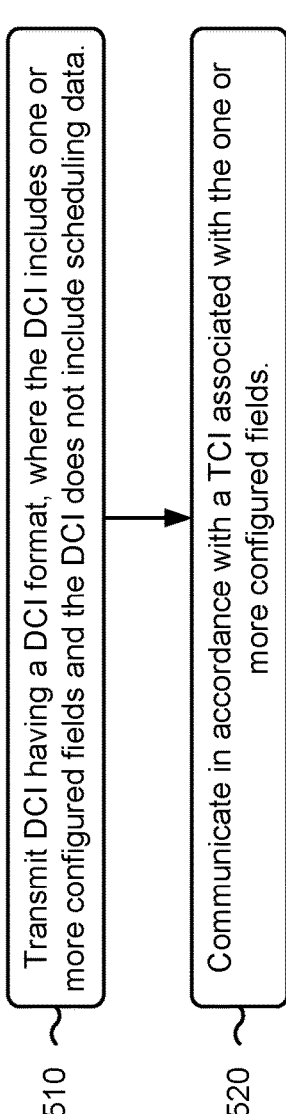

FIG. 5 is a diagram illustrating an example process 500 performed, for example, by a base station (BS). The process 500 is an example where the base station (for example, the base station 110) performs operations associated with using a DCI for beam indication without scheduling data.

As shown in FIG. 5, in some aspects, the process 500 may include transmitting DCI having a DCI format, where the DCI includes one or more configured fields and the DCI does not include scheduling data (block 510). For example, the base station (such as by using transmission component 704, depicted in FIG. 7) may transmit DCI having a DCI format, where the DCI includes one or more configured fields and the DCI does not include scheduling data, as described herein. In some aspects, the base station may include a first interface configured to output DCI having the DCI format.

As shown in FIG. 5, in some aspects, the process 500 may include communicating in accordance with a transmission control indicator (TCI) associated with the one or more configured fields (block 520). For example, the base station (such as by using reception component 702 or transmission component 704, depicted in FIG. 7) may communicate in accordance with a TCI associated with the one or more configured fields, as described herein. In some aspects, the base station may include the first interface or a second interface configured to output or obtain information in accordance with the TCI.

The process 500 may include additional aspects, such as any single aspect or any combination of aspects described below or in connection with one or more other processes described elsewhere herein.

In a first additional aspect, the DCI format is DCI format 1_1 or DCI format 1_2.

In a second additional aspect, the DCI includes an indication of the TCI and does not include another type of indication.

In a third additional aspect, the DCI format is a DCI format 1_0 or an uplink DCI format.

In a fourth additional aspect, the DCI includes a first indication of the TCI and a second indication of another setting.

In a fifth additional aspect, the second indication includes at least one of a secondary cell dormancy indication, a semi-persistent scheduling release indication, a semi-persistent scheduling activation indication, or a hybrid automatic repeat request indication.

In a sixth additional aspect, the TCI is based on a value for a TCI field parameter of the DCI.

In a seventh additional aspect, the TCI is based on a value for a non-TCI field parameter of the DCI.

In an eighth additional aspect, the TCI is based on one or more CORESET beams of the DCI.

In a ninth additional aspect, the DCI indicates a single TCI and the TCI is associated with a TCI pool, and the process 500 further includes communicating in accordance with multiple TCIs associated with the TCI pool based on the TCI.

In a tenth additional aspect, the DCI indicates multiple TCIs.

In an eleventh additional aspect, the DCI includes a TCI field indicating an identifier of a set of TCIs.

In a twelfth additional aspect, the set of TCIs is a single configured grouping of TCIs or a group of TCIs, selected from multiple configured groupings of TCIs, with a common attribute.

In a thirteenth additional aspect, the TCI includes a downlink TCI and an uplink TCI.

In a fourteenth additional aspect, the TCI is based on a RNTI associated with the DCI.

In a fifteenth additional aspect, the TCI is based on a mandatory field of the DCI.

In a sixteenth additional aspect, the TCI is based on a validation sequence configured for beam indication.

In a seventeenth additional aspect, the TCI is based on a value of a validation sequence associated with a non-TCI configuration.

In an eighteenth additional aspect, the process 500 includes receiving a capability indicator, where the capability indicator is associated with whether a UE supports DCI having a DCI format, where the DCI format includes one or more configured fields, and where the DCI format does not include scheduling data, and communicating in accordance with the capability indicator.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

Figure 6:
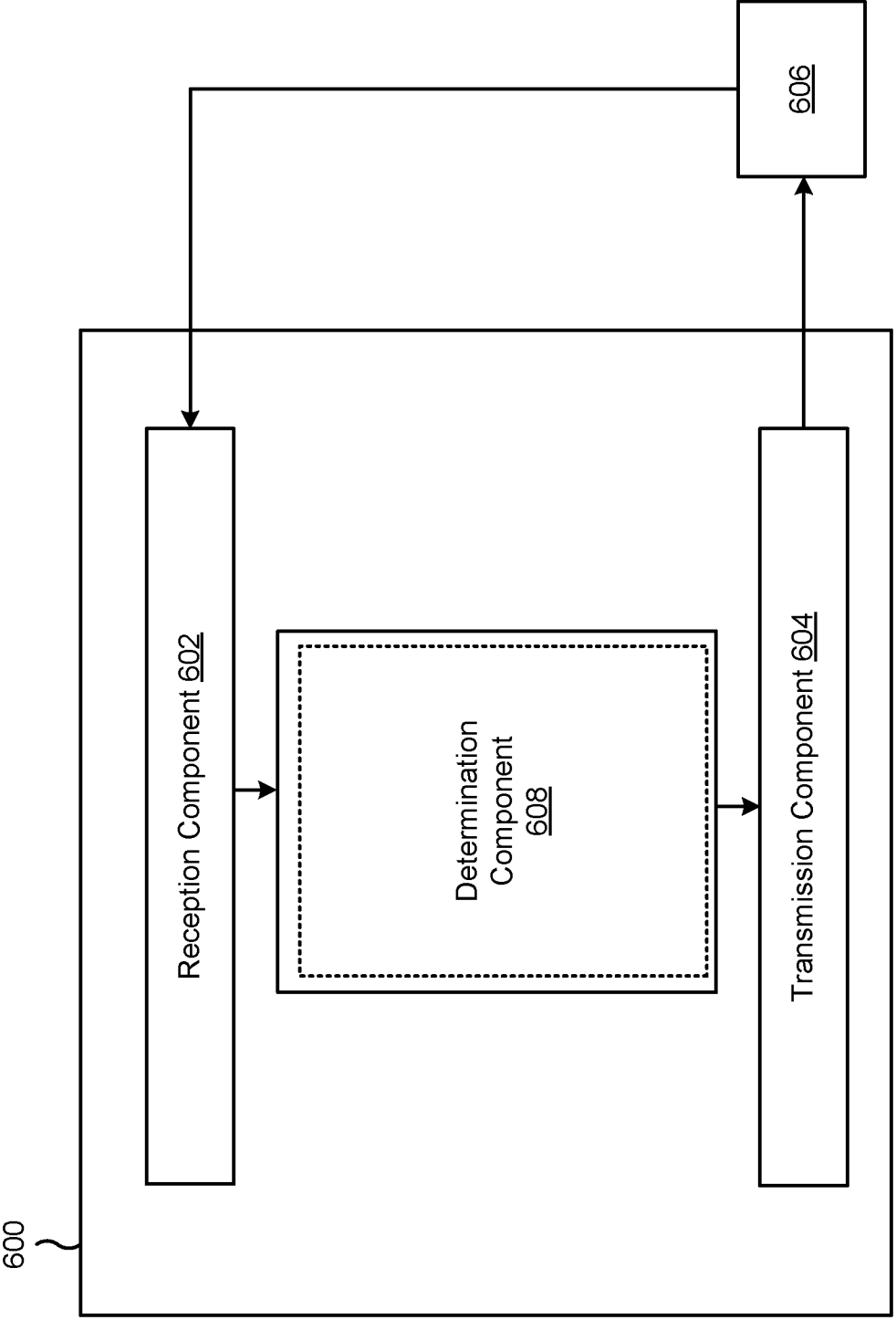
FIGS. 6 and 7 are block diagrams of example apparatuses for wireless communication

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses or one or more other components). As shown, the apparatus 600 may communicate with another apparatus 606 (such as a UE, a base station, or another wireless communication device) using the reception component 602 and the transmission component 604. As shown, the apparatus 600 may include one or more of a determination component 608, among other examples.

In some aspects, the apparatus 600 may be configured to perform one or more operations described herein. Additionally, or alternatively, the apparatus 600 may be configured to perform one or more processes described herein, such as process 400 of FIG. 4, the process 1100 of FIG. 11, among other examples. In some aspects, the apparatus 600 or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2. In some aspects, the reception component 602 may be a component of a processing system. For example, "processing system of the apparatus" 600 may refer to a system including the various other components or subcomponents of the apparatus 600.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver. In some aspects, the transmission component 604 may be a component of a processing system.

The processing system of the apparatus 600 may interface with other components of the apparatus 600, and may process information received from other components (such as inputs or signals), output information to other components, etc. For example, a chip or modem of the apparatus 600 may include a processing system, the reception component 602 to receive or obtain information, and the transmission component 604 to output, transmit or provide information. In some cases, the reception component 602 may refer to an interface between the processing system of the chip or modem and a receiver, such that the apparatus 600 may receive information or signal inputs, and the information may be passed to the processing system. In some cases, the transmission component 604 may refer to an interface between the processing system of the chip or modem and a transmitter, such that the apparatus 600 may transmit information output from the chip or modem. A person having ordinary skill in the art will readily recognize that the second interface also may obtain or receive information or signal inputs, and the first interface also may output, transmit or provide information.

The reception component 602 may receive downlink control information (DCI) having a DCI format, where the DCI includes one or more configured fields, and where the DCI does not include scheduling data. The reception component 602 or the transmission component 604 may communicate in accordance with a transmission control indicator (TCI) associated with the one or more configured fields. The determination component 608 may determine the TCI based on the one or more configured fields of the DCI. The transmission component 604 may transmit a capability indicator, where the capability indicator is associated with whether the UE supports DCI having a DCI format, where the DCI format includes one or more configured fields, and where the DCI format does not include scheduling data. The reception component 602 or the transmission component 604 may communicate in accordance with the capability indicator.

Figure 7:
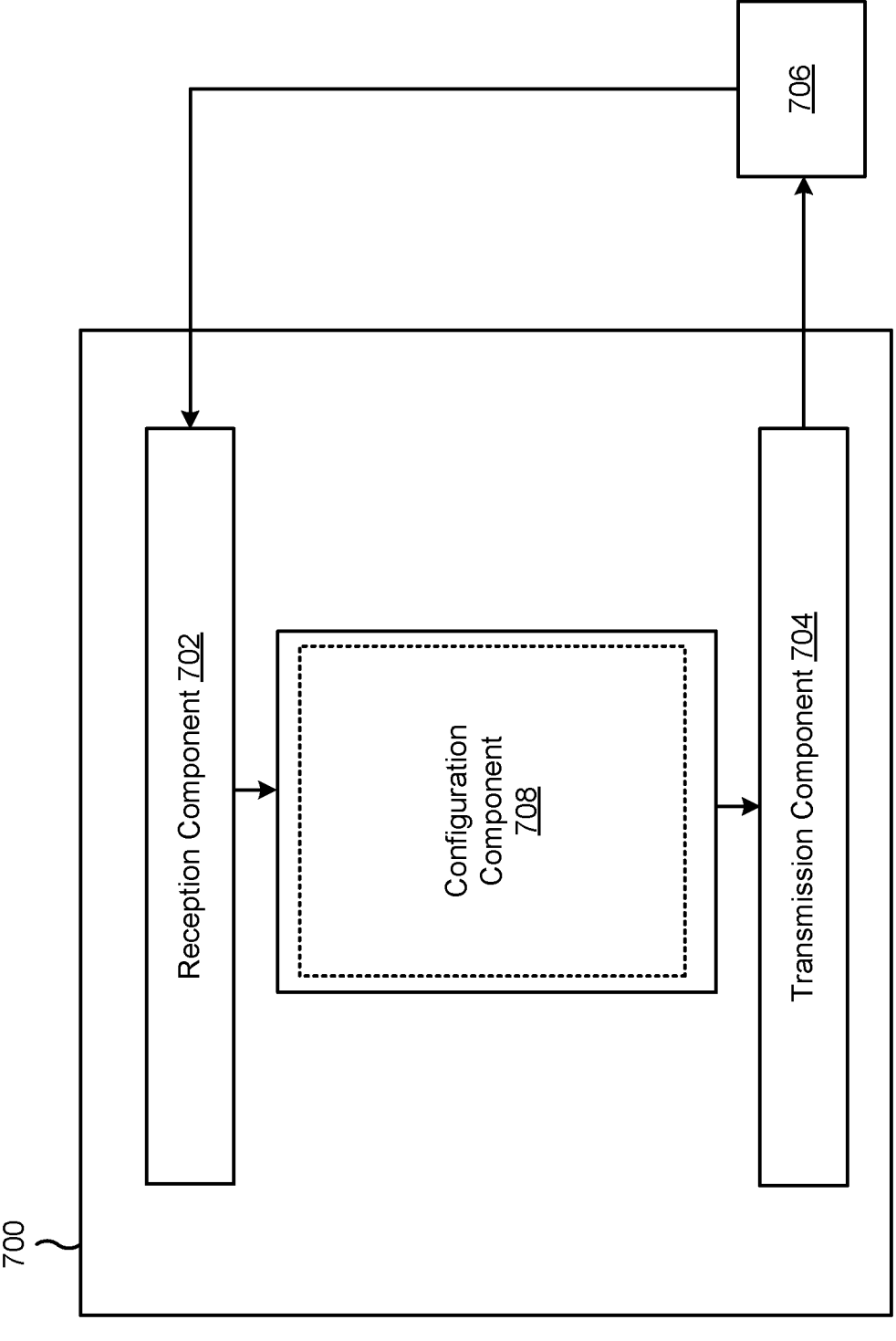

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses or one or more other components). As shown, the apparatus 700 may communicate with another apparatus 706 (such as a UE, a base station, or another wireless communication device) using the reception component 702 and the transmission component 704. As shown, the apparatus 700 may include one or more of a configuration component 708, among other examples.

In some aspects, the apparatus 700 may be configured to perform one or more operations described herein. Additionally, or alternatively, the apparatus 700 may be configured to perform one or more processes described herein, such as process 500 of FIG. 5, the process 1200 of FIG. 12, among other examples. In some aspects, the apparatus 700 or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2. In some aspects, the reception component 702 may be a component of a processing system. For example, a processing system of the apparatus 700 may refer to a system including the various other components or subcomponents of the apparatus 700.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver. In some aspects, the transmission component 704 may be a component of a processing system. For example, a processing system of the apparatus 700 may refer to a system including the various other components or subcomponents of the apparatus 700.

The processing system of the apparatus 700 may interface with other components of the apparatus 700, and may process information received from other components (such as inputs or signals), output information to other components, etc. For example, a chip or modem of the apparatus 700 may include a processing system, the reception component 702 to receive or obtain information, and the transmission component 704 to output, transmit or provide information. In some cases, the reception component 702 may refer to an interface between the processing system of the chip or modem and a receiver, such that the apparatus 700 may receive information or signal inputs, and the information may be passed to the processing system. In some cases, the transmission component 704 may refer to an interface between the processing system of the chip or modem and a transmitter, such that the apparatus 700 may transmit information output from the chip or modem. A person having ordinary skill in the art will readily recognize that the second interface also may obtain or receive information or signal inputs, and the first interface also may output, transmit or provide information.

The transmission component 704 may transmit downlink control information (DCI) having a DCI format, where the DCI includes one or more configured fields, and where the DCI does not include scheduling data. The reception component 702 or the transmission component 704 may communicate in accordance with a transmission control indicator (TCI) associated with the one or more configured fields. The configuration component 708 may configure the one or more configured fields of the DCI. The reception component 702 may receive a capability indicator, where the capability indicator is associated with whether a UE supports DCI having a DCI format, where the DCI format includes one or more configured fields, and where the DCI format does not include scheduling data. The reception component 702 or the transmission component 704 may communicate in accordance with the capability indicator.

Figure 10:
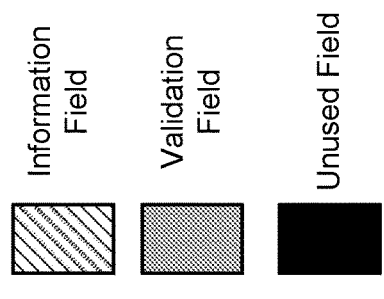

FIGS. 8-10 are diagrams associated with example aspects of the present disclosure.

How to use DCI to update beam indication in a unified TCI framework is of interest. The unified TCI framework includes common beam indication types. A device can use DCI format 1_1 or 1_2 with downlink (DL) assignment to indicate joint DL/uplink (UL) TCI states. Whether or how to use DCI to indicate TCI state without scheduling DL data is of interest. For DCI-based beam indication, it is considered to select at least one of the following alternatives regarding the support of DCI format(s) for beam indication in addition to the DCI formats 1_1/1_2 with DL assignment. Alternative 0—No additional DCI format is supported. DCI formats 1_1 and 1_2 without DL assignment are applicable for joint TCI as well as separate DL/UL TCI. In such a case, support for a DCI acknowledgment mechanism (based on SPS PDSCH release, based on triggered SRS, based on DCI indicating SCell dormancy, among other examples) may be configured. A question of how to identify DCI formats 1_1/1_2 used for beam indication only (not for scheduling a PDSCH reception, not indicating a SPS PDSCH release, or not indicating SCell dormancy), considering impacts on PDCCH coverage and scheduling mechanism, may be resolved. Whether the UE can assume the BS configured application time is after an acknowledgement (ACK) transmission may be resolved. Some aspects provide a dedicated DCI format other than 1_1/1_2 without DL assignment, applicable for joint TCI as well as separate DL/UL TCI. Support for a DCI acknowledgment mechanism (based on SPS PDSCH release, based on triggered SRS, based on DCI indicating SCell dormancy, among other examples) may be configured. If the format is based on an existing DCI format, how to identify the DCI format used for beam indication only may be resolved. Whether the UE can/shall assume the gNB configured application time is after ACK transmission may be resolved. Alternative—3 UL-related DCI formats 0_1/0_2 with UL grant, applicable only for UL-only TCI of separate DL/UL TCI.

On beam indication signalling medium to support joint or separate DL/UL beam indication in a unified TCI framework: a device may support layer 1 (L1)-based beam indication using at least UE-specific (unicast) DCI to indicate joint or separate DL/UL beam indication from the active TCI states. The DCI formats 1_1 and 1_2 can be reused for joint beam indication. It may be possible to support additional DCI format(s) (existing DCI formats 00, 0_1, 0_2, 1_0 as well as new DCI format(s) dedicated for beam indication).

3 types of TCI states are considered: Joint DL/UL common TCI state to indicate a common beam for at least one DL channel/RS plus at least one UL channel/RS; Separate DL common TCI state to indicate a common beam for more than one DL channel/RS; Separate UL common TCI state to indicate a common beam for more than one UL channel/RS. For NR Further enhanced MIMO (FeMIMO), on the unified TCI framework, a device may Support joint TCI for DL and UL based on and analogous to a DL TCI framework. The term "TCI" may at least include a TCI state that includes at least one source RS to provide a reference (UE assumption) for determining QCL or spatial filter. In a unified TCI framework, to accommodate the case of separate beam indication for UL and DL: A device may utilize two separate TCI states, one for DL and one for UL. For the separate DL TCI: The source reference signal(s) in M TCIs provide QCL information at least for UE-dedicated reception on a PDSCH and for UE-dedicated reception on all or a subset of CORE-SETs in a component carrier (CC). For the separate UL TCI: The source reference signal(s) in N TCIs provide a reference for determining common UL transmit (TX) spatial filter(s) at least for dynamic-grant/configured-grant based physical uplink shared channel (PUSCH) and for all or a subset of dedicated PUCCH resources in a CC. Optionally, this UL TX spatial filter can also apply to all SRS resources in resource set(s) configured for antenna switching/codebook-based/non-codebook-based UL transmissions.

Types of beam indication: Type 1—Joint DL/UL common TCI state to indicate a common beam for at least one DL channel/RS plus at least one UL channel/RS; Type 2—Separate DL common TCI state to indicate a common beam for more than one DL channel/RS; Type 3—Separate UL common TCI state to indicate a common beam for more than one UL channel/RS; Type 4—Separate DL single channel/RS TCI state to indicate a beam for a single DL channel/RS; Type 5—Separate UL single channel/RS TCI state to indicate a beam for a single UL channel/RS; Type 6—UL spatial relation info (SRI) to indicate a beam for a single UL channel/RS.

Some aspects described herein may describe methods to use DCI to indicate TCI state without scheduling data and for capability reporting. A BS may indicate to a UE that the DCI does not schedule a data transmission. A UE may distinguish from the DCI intended for other purposes (which also does not schedule data). The DCI may enable SPS release/activation, request Type 3 HARQ, or provide secondary cell dormancy indication, among other examples. The BS and the UE may use DCI format 1_1 and 1_2. The DCI may only indicate one purpose at a time. The BS and the UE may use other DCI formats (DCI Format 1_0 and UL format). The DCI can indicate more than one purpose (TCI indication and secondary cell dormancy indication, among other examples).

FIG. 8 is an example of an association between DCI formats and indicated configurations.

A validation sequence may depend on a resource allocation type: resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1, or resourceAllocation dynamicSwitch and all bits of the frequency domain resource assignment field in DCI format 1_1 are equal to 0 or 1.

For DCI format 1_1, 1_2 which may contain TCI field in DCI: If tci-PresentInDCI is set as 'enabled' (or tci-PresentForDCI-Format1-2-r16 is configured for the CORESET), a device can use the TCI field of DCI format 1_1 or (1_2) to indicate TCI state ID. Otherwise, the following options may be possible, among other examples. Option 1: UE does not expect to receive DCI that does not contain TCI field to indicate TCI state (without scheduling data). Option 2: The DCI may include other fields to indicate TCI state ID. Option 3: an implicit method may be used (the indicated beam is determined based on a CORESET beam(s) of the DCI). For a multiple-DCI (mDCI) multiple-transmit receive point (mTRP) scenario, the indicated beam is the CORESET beam, and can be used for a channel/RS scheduled by the same CORESET pool identifier (ID). For a single-DCI (sDCI) mTRP case, the indicated TCI state can be determined based on the CORESET beam (If the CORESET beam sending the DCI corresponds to a TCI codepoint of 2 TCI states, then the CORESET beam is the indicated beam, if the CORESET beam sending the DCI corresponds to a single TCI state, then find the lowest ID TCI codepoint corresponding to a TCI state pair containing the CORESET TCI state). For DCI format 1_0 or UL DCI format, a device may use Options 1 through 3, as the options do not include a TCI state field. For UL DCI format, a device can use the field for SRI (or UL TCI state), if present, to indicate a TCI state ID.

There may be options for whether both DL TCI and UL TCI states can be signaled in one instance of beam indication DCI. Option 1—one DCI can only indicate one TCI state. In such a case, a UE is configured different TCI state pools and may use additional bits or other signaling to identify which TCI state pool the DCI is referring to, such as an UL TCI state pool or DL TCI state pool; all TCI states may be configured in the same pool; the UE may use other fields as well as TCI state to indicate TCI state. Option 2—one DCI can indicate more than one TCI state, where the multiple TCI states can include one DL and one UL. Option 2-1—there can be a direct indication multiple TCI states in the DCI. In such cases, the DCI may use a TCI field to indicate one TCI and another unused field (a modulation and coding scheme (MCS) field) to indicate another TCI. Option 2-2—use a field (a TCI field) to indicate the ID of a TCI pair/set. Option 2-2-1—The pairing/grouping of TCI states is configured by BS signaling and DCI indicates an ID of the pairing/grouping. Option 2-2-2—The TCI field indicates an index and TCI states corresponding to the index in each pool/group are indicated. In such a case, multiple pools/groups may be preconfigured by a BS. As an example, for a DCI indicate index "1" in a TCI field, both TCI states indexed "1" (in DL and UL TCI state pools) are indicated.

For a DCI that can only indicate one purpose at a time, to distinguish with the DCI to indicate other purposes, a beam indication DCI may use at least one of the following options from the indication methods for other purposes (SPS release/activation, Type 3 HARQ request, secondary cell (SCell) dormancy, among other examples): different RNTI, different DCI formats, at least one different field used for validation, different validation sequence in the same validation fields.

FIG. 9 is an example of an association between RNTIs or DCI formats and configurations indicated in DCI. With regard to FIG. 9, a new RNTI for beam indication may be defined, a new DCI format for beam indication may be defined, or a BS may use a combination of an RNTI and a DCI format not used for other purposes. For example, a BS may use C-RNTI or MCS-C-RNTI and format 1_0 or 12 (or UL DCI) format to indication TCI state. For format 1_0 or 1_2, a validation sequence/field can be any possible combination. For example, the BS may reuse SPS/UL Type 2 release format. In such a case, for DCI format 1_0, the BS may use a HARQ process ID field, or time domain resource assignment (TDRA) to indicate a TCI state ID.

FIG. 10 is an example of a use of validation information in a DCI field. For example, the BS may use a field that is mandatory (that is not selectively present) in the DCI format. A new validation field that is not mandatory may not be used for an information field for other purposes. Additionally, or alternatively to the DCI fields illustrated in FIG. 10, for DCI 1_1, possible fields include: a TPC command for scheduled PUCCH (2 bits), a PUCCH resource indicator (2 bits), or an SRS request (3 bits), among other examples; for DCI 1_2, possible fields include: a TPC command for scheduled PUCCH (2 bits).

In some aspects, a UE, such as the UE 120, may identify a received DCI used to indicate TCI configuration without scheduling a downlink assignment, when the DCI uses a different DCI field for validation than is used for other purposes. For example, when the received DCI uses DCI format 1_1 or 1_2 whose CRC is scrambled by C-RNTI or MCS-C-RNTI; when one-shot HARQ request is "0" or not available; when the bits in FDRA field are all "1" or "0" (based on resource allocation type); and when bits in a field not used by other validation purposes (a TPC command for scheduled PUCCH match a configured sequence, such as when the field is all "1"); a UE may determine that the DCI is to indicate TCI state without scheduling data. The TCI state ID may be indicated in TCI state field (if tci-PresentIn-DCI is set as 'enabled' or if tci-PresentForDCI-Format1-2-r16 is configured for the CORESET). Alternatively, a BS may use at least one of an MCS field, a new data indicator (NDI) field, or a redundancy version (RV) field, among other examples to indicate a TCI state.

In some aspects, the DCI for beam indication without scheduling a downlink assignment may use the same DCI format indicator, the same type of RNTI to scramble CRC bits of the DCI, or the same fields for validation as in other indication purposes, such as SPS activation/release, Type 3 HARQ request, or secondary cell dormancy indication. In such cases, a new validation sequence for beam indication may be defined to distinguish the purpose of the DCI (beam indication) from the other indication purposes using the same validation fields. For example, a DCI to indicate a TCI state to a UE may use the same DCI format, the same RNTI to scramble CRC bits, and the same fields for validations as a DCI to indicate SPS release to the UE. In this example, a first validation sequence is defined differently for the DCI to indicate the TCI state relative to a second validation sequence to indicate the SPS release (in at least one of validation field). As an example, the RV field validation sequence may be defined as all "1"s for beam indication purpose and as all "0"s for SPS release or activation. In this way, a UE can determine the indication purpose by examining the bits in the RV field of a received DCI.

In another example, the BS may use a CS-RNTI to scramble a CRC and may use DCI format 10, 1_1, or 1_2. In such a case, if an NDI is "0"; and if at least one of an MCS field, an RV field, or an FDRA field, among other examples, is using a configured sequence different from a configured sequence used for SPS release or activation (defining at least one of the following: RV=all "1", MCS=all "1", or FDRA is using a configured sequence other than all "0" or all "1", and the other fields among MCS, RV, or FDRA may use the same sequence as SPSs); then a UE may determine that the DCI is to indicate TCI state. The DCI may use a TCI field, if present, to indicate a TCI state ID. Otherwise, the DCI may use another reserved field to indicate the TCI state ID, such as an FDRA field, a HARQ field, or an antenna port field, among other examples. In some aspects, a rule may be defined such that a validation sequence for beam indication is not to be contained in the same fields in the DCI to indicate other purposes.

Additionally, or alternatively to fields used for validation purposes and fields to indicate a TCI state ID, a DCI format used for beam indication (without scheduling an assignment of data transmission), may include information bits in one or more additional fields. For example, the DCI format may be defined to include information bits for a DCI format indicator, a TDRA, an identifier of the DCI format, a carrier indicator, a bandwidth part (BWP) indicator, a downlink assignment index (if configured), a TPC command for scheduled PUCCH, a PUCCH resource indicator, or a PDSCH-to-HARQ feedback timing indicator (if present), among other examples. In some aspects, one or more fields can be used to indicate information to locate a time resource or frequency resource for an ACK to the DCI or for a power control parameter for the PUCCH to carry the ACK to the DCI. In some aspects, one or more fields can be used to indicate information regarding an indicated TCI state, such as a power control configuration for an uplink transmission associated with the indicated TCI state.

In some aspects, one or more fields used for validation or information, which are defined for a DCI format, may be omitted from a DCI of the DCI format when the DCI is used for beam indication without scheduling a data. For example, one or more evaluation rules may be defined to enable omission of a defined field from a DCI without preventing validation or information conveyance for beam indication. In some aspects, a UE is not expected to receive a DCI to indicate a TCI state ID when a defined field for validation or for indicating information is not present in the DCI. Alternatively, an additional field can be used for validation or indicating information when a defined field is not present in a DCI format. In some aspects, a UE may determine, for a field that is not present, a reserved sequence of bits to enable interpretation of a DCI. For example, the RV field may be used for validation in a DCI to indicate TCI state without scheduling data and the RV field may not be present or configured in a DCI of DCI format 1_2. In this example, the UE may be configured to not receive a DCI in format 1_2 to indicate a TCI state without scheduling data. Alternatively, when the RV field is not present in RV field, the UE may be configured to assume a predefined sequence such as '0' in the field. Alternatively, a rule can be defined such that UE can use an alternative field (such as an MCS field) for validation. Similar rules can be applied to cases when other fields used to indicate TCI state information or additional information are not present in the DCI. For example, if a configured field is not included in a DCI, the UE may use a configured alternative field for validation. Additionally, or alternatively, the UE may use a configured default sequence for validation. Additionally, or alternatively, the UE may use another DCI.

Some BSs and UEs may not support indication of more than one purpose at a time (TCI indication and at least one of a SPS activation/release, a Type 3 HARQ request, an SCell dormancy indication, among other examples). In such a case, a UE does not expect to receive a DCI to indicate TCI state as well as other purposes. Some aspects herein enable using a single DCI to indicate a TCI state and at least one of one of an SPS activation/release, a Type 3 HARQ, an SCell dormancy, among other examples. A BS and a UE may use a different combination of validation fields and sequences from the case of a single purpose in the DCI to indicate that the DCI is to indicate multiple purposes.

In one aspect, a DCI format can be defined to indicate a TCI state and an SPS activation or release. For example, a BS may use a CS-RNTI in connection with DCI format 10, 1_1, or 1_2. In such a case, if an NDI field and an RV field are all "0"; and if an MCS field is a configured reserved index for initial TX that is different from an index used for TCI indication only (or SPS/UL release/activation only); the UE may determine that the DCI is to indicate TCI state and SPS release/activation. In such a case, the DCI may use a TCI field, if present, to indicate a TCI state ID. Otherwise, the DCI may use an FDRA field to indicate a TCI state ID. The DCI may use a HARQ process ID field to indicate a configuration for the SPS release/activation.

When using a DCI format 1_1 whose CRC is scrambled by a C-RNTI or a modulation and coding scheme (MCS)-specific C-RNTI (MCS-C-RNTI); and when a one-shot HARQ request field is set to "1"; when an FDRA field is set to "1" or "0" based on resource allocation type; and when a TPC command for a scheduled PUCCH matches a config-ured sequence that is different from the sequence used in the case of only indicating TCI; the UE may determine that the DCI is to indicate a TCI state and request a Type 3 HARQ without scheduling data. In such a case, the TCI state ID is indicated in TCI state field, if tci-PresentInDCI is set as "enabled" (or tci-PresentForDCI-Format1-2-r16 is config-ured for the CORESET). Else, the DCI may use at least one of an MCS field, an NDI field, or an RV field, among other examples to indicate the TCI state.

When using DCI format 1_1 whose CRC is scrambled by C-RNTI or MCS-C-RNTI; when a one-shot HARQ request field is not present or set to "0"; when an FDRA field is "1" or "0" (based on resource allocation type); and when a TPC command for a scheduled PUCCH matches a configured sequence that is different from the sequence used in the case of only indicating a TCI; a UE may determine that the DCI is to indicate a TCI state and request a Type 3 HARQ without scheduling data. In such a case, the TCI state ID is indicated in a TCI state field, if tci-PresentInDCI is set as "enabled" (or tci-PresentForDCI-Format1-2-r16 is config-ured for the CORESET). Else, the DCI may use at least one of a PUCCH resource indicator or an SRS request, among other examples to indicate the TCI state. The DCI may use the same fields as shown in FIG. 10 to indicate SCell dormancy bitmaps.

Figure 11:
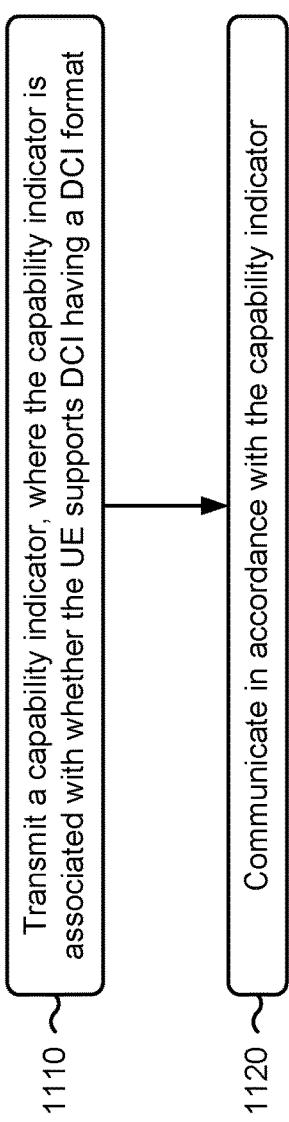

FIG. 11 is a diagram illustrating an example process 1100 performed, for example, by an apparatus. The process 1100 is an example where the UE (for example, the UE 120) performs operations associated with capability indication for DCIs for beam indication without scheduling data.

As shown in FIG. 11, in some aspects, the process 1100 may include transmitting a capability indicator, where the capability indicator is associated with whether the UE supports DCI having a DCI format (block 1110). For example, the UE (such as by using transmission component 604, depicted in FIG. 6) may transmit a capability indicator, where the capability indicator is associated with whether the UE supports DCI having a DCI format, where the DCI format includes one or more configured fields, and where the DCI format does not include scheduling data, as described herein. In some aspects, the UE may include a first interface configured to output a capability indicator.

As further shown in FIG. 11, in some aspects, the process 1100 may include communicating in accordance with the capability indicator (block 1120). For example, the UE (such as by using reception component 602 or transmission com-ponent 604, depicted in FIG. 6) may communicate in accordance with the capability indicator, as described herein. In some aspects, the UE may include the first interface or a second interface configured to obtain or output communications in accordance with the capability indicator.

The process 1100 may include additional aspects, such as any single aspect or any combination of aspects described below or in connection with one or more other processes described elsewhere herein.

In a first additional aspect, the one or more configured fields are associated with a TCI.

In a second additional aspect, the capability indicator identifies UE support for the DCI having the DCI format.

In a third additional aspect, the process 1100 includes receiving the DCI having the DCI format, and communi-cating in accordance with the capability indicator includes communicating in accordance with a TCI associated with the one or more configured fields.

In a fourth additional aspect, the capability indicator is included in an optional field of an uplink control information (UCI) message.

In a fifth additional aspect, the capability indicator is a single capability indicator indicating support for the DCI format not including scheduling data and for another DCI format including scheduling data.

In a sixth additional aspect, the capability indicator is a first capability indicator indicating support for the DCI format not including scheduling data.

In a seventh additional aspect, the process 1100 includes transmitting a second capability indicator indicating support for another DCI format including scheduling data, and communicating in accordance with the capability indicator includes communicating in accordance with the first capa-bility indicator and the second capability indicator.

Although FIG. 11 shows example blocks of the process 1100, in some aspects, the process 1100 may include addi-tional blocks, fewer blocks, different blocks, or differently arranged blocks than those depicted in FIG. 11. Additionally, or alternatively, two or more of the blocks of the process 1100 may be performed in parallel.

FIG. 12 is a diagram illustrating an example process 1200 performed, for example, by an apparatus. The process 1200 is an example where the base station (for example, the base station 110) performs operations associated with capability indication for DCIs for beam indication without scheduling data.

As shown in FIG. 12, in some aspects, the process 1200 may include receiving a capability indicator, where the capability indicator is associated with whether a UE sup-ports DCI having a DCI format (block 1210). For example, the base station (such as by using reception component 702, depicted in FIG. 7) may receive a capability indicator, where the capability indicator is associated with whether a UE supports DCI having a DCI format, where the DCI format includes one or more configured fields, and where the DCI format does not include scheduling data, as described herein. In some aspects, the BS may include a first interface configured to obtain the capability indicator.

As further shown in FIG. 12, in some aspects, the process 1200 may include communicating in accordance with the capability indicator (block 1220). For example, the base station (such as by using reception component 702 or transmission component 704, depicted in FIG. 7) may communicate in accordance with the capability indicator, as described herein. In some aspects, the BS may include the first interface or a second interface configured to output or obtain communications in accordance with the capability indicator.

The process 1200 may include additional aspects, such as any single aspect or any combination of aspects described below or in connection with one or more other processes described elsewhere herein.

In a first additional aspect, the one or more configured fields are associated with a TCI.

In a second additional aspect, the capability indicator identifies UE support for the DCI having the DCI format.

In a third additional aspect, the process 1200 includes transmitting the DCI having the DCI format, and communicating in accordance with the capability indicator includes communicating in accordance with a TCI associated with the one or more configured fields.

In a fourth additional aspect, the capability indicator is included in an optional field of a UCI message.

In a fifth additional aspect, the capability indicator is a single capability indicator indicating support for the DCI format not including scheduling data and for another DCI format including scheduling data.

In a sixth additional aspect, the capability indicator is a first capability indicator indicating support for the DCI format not including scheduling data.

In a seventh additional aspect, the process 1200 includes receiving a second capability indicator indicating support for another DCI format including scheduling data, and communicating in accordance with the capability indicator includes communicating in accordance with the first capability indicator and the second capability indicator.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

FIG. 13 is a diagram illustrating an example 1300 associated with capability indication for and use of a DCI format for beam indication without scheduling data, in accordance with the present disclosure. As shown in FIG. 13, a base station 110 and a UE 120 may communicate with one another.

As shown by reference number 1305, the UE 120 may transmit a capability indication to the base station 110. For example, the UE 120 may transmit a UCI indicating whether the UE 120 supports a DCI format for beam indication without scheduling data. In this case, the UCI may include an optional field for indicating support of one or more DCI formats, such as DCI format 1_1 or DCI format 1_2, among other examples. In some aspects, the UE 120 may transmit a single UE capability indication. For example, the UE 120 may transmit a UCI with a single field to indicate whether the UE 120 supports both a beam indication DCI with or without a downlink assignment. Alternatively, the UE 120 may transmit a plurality of capability indications, such as a first capability indication of whether the UE 120 supports a beam indication DCI with a downlink assignment and a second capability indication of whether the UE 120 supports a beam indication DCI without a downlink assignment.

As shown by reference number 1310, the base station 110 may transmit and the UE 120 may receive a DCI. For example, the UE 120 may receive a beam indication DCI that does not schedule downlink data based on the UE 120 providing the capability indication to indicate that the UE 120 supports the beam indication DCI without a downlink assignment. In this case, the beam indication DCI may be a DCI format 1_1, a DCI format 1_2, a DCI format 10, an uplink format DCI, among other examples, that includes one or more configured fields to indicate a TCI. Additionally, or alternatively, the beam indication DCI may include one or more configured fields for another indication, such as a secondary cell dormancy indication in addition to the TCI.

As shown by reference number 1315, the UE 120 may determine a communication configuration based on the DCI. For example, UE 120 may determine a TCI to use in communication with the base station 110. In some aspects, the UE 120 may determine that the DCI includes a TCI field to determine the communication configuration. For example, the UE 120 may parse the DCI to identify a field indicating whether an indication of a TCI is included in the DCI. Additionally, or alternatively, the UE 120 may determine that the DCI includes a TCI field based on an RNTI, a DCI format, a validation field, or a validation sequence. When a TCI field is not present in the DCI, the UE 120 may determine a TCI based on other information. For example, the UE 120 may determine that a TCI is included in the DCI based on another field in the DCI, a CORESET beam of the DCI, or a default configuration. In another example, when the field is not present, the UE 120 may determine that the DCI does not indicate a TCI state.

In some aspects, the UE 120 may identify a plurality of TCI states based on the DCI. For example, the UE 120 may receive a DCI identifying a single TCI within a TCI pool and the UE 120 may apply the TCI to the TCI pool. In this case, the TCI pool may include an uplink TCI pool or a downlink TCI pool. In another example, the UE 120 may receive a DCI identifying a plurality of TCIs, such as an uplink TCI and a downlink TCI. In this case, the DCI may include an explicit indicator of the plurality of TCIs (for example, a first indicator of a first TCI in a TCI field and a second indicator of a second TCI in another field, such as an MCS field). Alternatively, the DCI may include an identifier from which the UE 120 may derive a plurality of TCIs (for example, an index value with which the UE 120 may perform a table lookup to identify a plurality of TCIs corresponding to the index value). In this case, the table from which to perform a table lookup (or another data structure or pool) may be configured with signaling received from the base station 110.

As shown by reference number 1320, the UE 120 may communicate with the base station 110 in accordance with the communication configuration. For example, the UE 120 may transmit signaling to the base station 110 (on an uplink) or receive signaling from the base station 110 (on a downlink) using a TCI identified from the DCI. In some aspects, the UE 120 may communicate on another link in accordance with the communication configuration, such as a sidelink.

The following provides an overview of some Aspects of the present disclosure:

Aspect 1: A method of wireless communication performed by an apparatus of a UE, including: receiving DCI having a DCI format, where the DCI includes one or more configured fields, and where the DCI does not include scheduling data; and communicating in accordance with a TCI associated with the one or more configured fields.

Aspect 2: The method of Aspect 1, where the DCI format is DCI format 1_1 or DCI format 1_2.

Aspect 3: The method of Aspect 2, where the DCI includes an indication of the TCI and does not include another type of indication.

Aspect 4: The method of Aspect 1, where the DCI format is a DCI format 1_0 or an uplink DCI format.

Aspect 5: The method of Aspects 1 to 4, where the DCI includes a first indication of the TCI and a second indication of another setting.

Aspect 6: The method of Aspect 5, where the second indication includes at least one of: a secondary cell dormancy indication, a semi-persistent scheduling release indication, a semi-persistent scheduling activation indication, or a hybrid automatic repeat request indication.

Aspect 7: The method of any of Aspects 1 to 6, where the TCI is based on a value for a TCI field parameter of the DCI.

Aspect 8: The method of any of Aspects 1 to 7, where the TCI is based on a value for a non-TCI field parameter of the DCI.

Aspect 9: The method of any of Aspects 1 to 8, where the TCI is based on one or more CORESET beams of the DCI.

Aspect 10: The method of any of Aspects 1 to 9, where the DCI indicates a single TCI and the TCI is associated with a TCI pool, and further including: configuring a plurality of TCIs associated with the TCI pool based on the TCI.

Aspect 11: The method of any of Aspects 1 to 9, where the DCI indicates a plurality of TCIs.

Aspect 12: The method of any of Aspects 1 to 11, where the DCI includes a TCI field indicating an identifier of a set of TCIs.

Aspect 13: The method of Aspect 12, where the set of TCIs is a single configured grouping of TCIs or a group of TCIs, selected from a plurality of configured groupings of TCIs, with a common attribute.

Aspect 14: The method of any of Aspects 1 to 13, where the TCI includes a downlink TCI and an uplink TCI.

Aspect 15: The method of any of Aspects 1 to 14, where the TCI is based on a RNTI associated with the DCI.

Aspect 16: The method of any of Aspects 1 to 15, where the TCI is based on a mandatory field of the DCI.

Aspect 17: The method of any of Aspects 1 to 16, where the TCI is based on a validation sequence configured for beam indication.

Aspect 18: The method of any of Aspects 1 to 16, where the TCI is based on a value of a validation sequence associated with a non-TCI configuration.

Aspect 19: The method of any of Aspects 1 to 18, where a configured field associated with the TCI is not present in the one or more configured fields of the DCI, and where the UE is configured to determine the TCI based on at least one of another DCI, another indicator that is not a DCI, another configured field that is present in the one or more configured fields of the DCI, a default configuration.

Aspect 20: A method of wireless communication performed by a base station, including: transmitting DCI having a DCI format, where the DCI includes one or more configured fields, and where the DCI does not include scheduling data; and communicating in accordance with a TCI associated with the one or more configured fields.

Aspect 21: The method of Aspect 20, where the DCI format is DCI format 1_1 or DCI format 1_2.

Aspect 22: The method of Aspect 21, where the DCI includes an indication of the TCI and does not include another type of indication.

Aspect 23: The method of Aspect 20, where the DCI format is a DCI format 1_0 or an uplink DCI format.

Aspect 24: The method of Aspect 23, where the DCI includes a first indication of the TCI and a second indication of another setting.

Aspect 25: The method of Aspect 24, where the second indication includes at least one of: a secondary cell dormancy indication, a semi-persistent scheduling release indication, a semi-persistent scheduling activation indication, or a hybrid automatic repeat request indication.

Aspect 26: The method of any of Aspects 20 to 25, where the TCI is based on a value for a TCI field parameter of the DCI.

Aspect 27: The method of any of Aspects 20 to 26, where the TCI is based on a value for a non-TCI field parameter of the DCI.

Aspect 28: The method of any of Aspects 20 to 27, where the TCI is based on one or more CORESET beams of the DCI.

Aspect 29: The method of any of Aspects 20 to 28, where the DCI indicates a single TCI and the TCI is associated with a TCI pool, and further including: communicating in accordance with a plurality of TCIs associated with the TCI pool based on the TCI.

Aspect 30: The method of any of Aspects 20 to 28, where the DCI indicates a plurality of TCIs.

Aspect 31: The method of any of Aspects 20 to 30, where the DCI includes a TCI field indicating an identifier of a set of TCIs.

Aspect 32: The method of Aspect 30, where the set of TCIs is a single configured grouping of TCIs or a group of TCIs, selected from a plurality of configured groupings of TCIs, with a common attribute.

Aspect 33: The method of any of Aspects 20 to 32, where the TCI includes a downlink TCI and an uplink TCI.

Aspect 34: The method of any of Aspects 20 to 33, where the TCI is based on a radio network temporary identifier (RNTI) associated with the DCI.

Aspect 35: The method of any of Aspects 20 to 34, where the TCI is based on a mandatory field of the DCI.

Aspect 36: The method of any of Aspects 20 to 35, where the TCI is based on a validation sequence configured for beam indication.

Aspect 37: The method of any of Aspects 20 to 36, where the TCI is based on a value of a validation sequence associated with a non-TCI configuration.

Aspect 38: A method of wireless communication performed by an apparatus of a UE, including: transmitting a capability indicator, where the capability indicator is associated with whether the UE supports DCI having a DCI format, where the DCI format includes one or more configured fields, and where the DCI format does not include scheduling data; and communicating in accordance with the capability indicator.

Aspect 39: The method of Aspect 38, where the one or more configured fields are associated with a TCI.

Aspect 40: The method of any of Aspects 38 to 39, where the capability indicator identifies UE support for the DCI having the DCI format.

Aspect 41: The method of Aspect 40, further including: receiving the DCI having the DCI format, and where communicating in accordance with the capability indicator includes: communicating in accordance with a TCI associated with the one or more configured fields.

Aspect 42: The method of any of Aspects 38 to 41, where the capability indicator is included in an optional field of an uplink control information (UCI) message.

Aspect 43: The method of any of Aspects 38 to 42, where the capability indicator is a single capability indicator indicating support for the DCI format not including scheduling data and for another DCI format including scheduling data.

Aspect 44: The method of any of Aspects 38 to 43, where the capability indicator is a first capability indicator indicating support for the DCI format not including scheduling data.

Aspect 45: The method of Aspect 44, further including: transmitting a second capability indicator indicating support for another DCI format including scheduling data; and where communicating in accordance with the capability indicator includes: communicating in accordance with the first capability indicator and the second capability indicator.

Aspect 46: A method of wireless communication performed by an apparatus of a BS, including: receiving a capability indicator, where the capability indicator is associated with whether a UE supports downlink DCI having a DCI format, where the DCI format includes one or more configured fields, and where the DCI format does not include scheduling data; and communicating in accordance with the capability indicator.

Aspect 47: The method of Aspect 46, where the one or more configured fields are associated with a TCI.

Aspect 48: The method of any of Aspects 46 to 47, where the capability indicator identifies UE support for the DCI having the DCI format.

Aspect 49: The method of Aspect 48, further including: transmitting the DCI having the DCI format, and where communicating in accordance with the capability indicator includes: communicating in accordance with a TCI associated with the one or more configured fields.

Aspect 50: The method of any of Aspects 46 to 49, where the capability indicator is included in an optional field of an UCI message.

Aspect 51: The method of any of Aspects 46 to 50, where the capability indicator is a single capability indicator indicating support for the DCI format not including scheduling data and for another DCI format including scheduling data.

Aspect 52: The method of any of Aspects 46 to 51, where the capability indicator is a first capability indicator indicating support for the DCI format not including scheduling data.

Aspect 53: The method of Aspect 34, further including: receiving a second capability indicator indicating support for another DCI format including scheduling data; and where communicating in accordance with the capability indicator includes: communicating in accordance with the first capability indicator and the second capability indicator.

Aspect 54: An apparatus for wireless communication at a device, including a processor; memory coupled with the processor; and instructions stored in the memory and executable by the processor to cause the apparatus to perform the method of one or more Aspects of Aspects 1-19.

Aspect 55: A device for wireless communication, including a memory and one or more processors coupled to the memory, the memory and the one or more processors configured to perform the method of one or more Aspects of Aspects 1-19.

Aspect 56: An apparatus for wireless communication, including at least one means for performing the method of one or more Aspects of Aspects 1-19.

Aspect 57: A non-transitory computer-readable medium storing code for wireless communication, the code including instructions executable by a processor to perform the method of one or more Aspects of Aspects 1-19.

Aspect 58: A non-transitory computer-readable medium storing a set of instructions for wireless communication, the set of instructions including one or more instructions that, when executed by one or more processors of a device, cause the device to perform the method of one or more Aspects of Aspects 1-19.

Aspect 59: An apparatus for wireless communication at a device, including a processor; memory coupled with the processor; and instructions stored in the memory and executable by the processor to cause the apparatus to perform the method of one or more Aspects of Aspects 20-37.

Aspect 60: A device for wireless communication, including a memory and one or more processors coupled to the memory, the memory and the one or more processors configured to perform the method of one or more Aspects of Aspects 20-37.

Aspect 61: An apparatus for wireless communication, including at least one means for performing the method of one or more Aspects of Aspects 20-37.

Aspect 62: A non-transitory computer-readable medium storing code for wireless communication, the code including instructions executable by a processor to perform the method of one or more Aspects of Aspects 20-37.

Aspect 63: A non-transitory computer-readable medium storing a set of instructions for wireless communication, the set of instructions including one or more instructions that, when executed by one or more processors of a device, cause the device to perform the method of one or more Aspects of Aspects 20-37.

Aspect 64: An apparatus for wireless communication at a device, including a processor; memory coupled with the processor; and instructions stored in the memory and executable by the processor to cause the apparatus to perform the method of one or more Aspects of Aspects 38-45.

Aspect 65: A device for wireless communication, including a memory and one or more processors coupled to the memory, the memory and the one or more processors configured to perform the method of one or more Aspects of Aspects 38-45.

Aspect 66: An apparatus for wireless communication, including at least one means for performing the method of one or more Aspects of Aspects 38-45.

Aspect 67: A non-transitory computer-readable medium storing code for wireless communication, the code including instructions executable by a processor to perform the method of one or more Aspects of Aspects 38-45.

Aspect 68: A non-transitory computer-readable medium storing a set of instructions for wireless communication, the set of instructions including one or more instructions that, when executed by one or more processors of a device, cause the device to perform the method of one or more Aspects of Aspects 38-45.

Aspect 69: An apparatus for wireless communication at a device, including a processor; memory coupled with the processor; and instructions stored in the memory and executable by the processor to cause the apparatus to perform the method of one or more Aspects of Aspects 46-53.

Aspect 70: A device for wireless communication, including a memory and one or more processors coupled to the memory, the memory and the one or more processors configured to perform the method of one or more Aspects of Aspects 46-53.

Aspect 71: An apparatus for wireless communication, including at least one means for performing the method of one or more Aspects of Aspects 46-53.

Aspect 72: A non-transitory computer-readable medium storing code for wireless communication, the code including instructions executable by a processor to perform the method of one or more Aspects of Aspects 46-53.

Aspect 73: A non-transitory computer-readable medium storing a set of instructions for wireless communication, the set of instructions including one or more instructions that, when executed by one or more processors of a device, cause the device to perform the method of one or more Aspects of Aspects 46-53.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, satisfying a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   transmitting a capability indication indicating whether the UE supports a downlink control information (DCI) format without a downlink assignment and indicating whether the UE supports another DCI format with a downlink assignment;
   receiving DCI having the DCI format, wherein the DCI includes one or more configured fields, and wherein the DCI does not include scheduling data; and
   communicating in accordance with a transmission configuration indicator (TCI) associated with the one or more configured fields.

2. The method of claim 1, wherein the DCI format is DCI format 11 or DCI format 12, and wherein the DCI includes an indication of the TCI and does not include another type of indication.

3. The method of claim 1, wherein the DCI format is a DCI format 1_0 or an uplink DCI format, and wherein the DCI includes a first indication of the TCI and a second indication of another setting.

4. The method of claim 3, wherein the second indication includes at least one of:
   a secondary cell (SCell) dormancy indication,
   a semi-persistent scheduling (SPS) release indication, an SPS activation indication, or
   a hybrid automatic repeat request (HARQ) indication.

5. The method of claim 1, wherein the TCI is based on a value for a TCI field parameter of the DCI, a value for a non-TCI field parameter of the DCI, or one or more control resource set (CORESET) beams of the DCI.

6. The method of claim 1, wherein the DCI indicates a plurality of TCIs or a single TCI associated with a TCI pool from which to configure the plurality of TCIs.

7. The method of claim 1, wherein the DCI includes a TCI field indicating an identifier of a set of TCIs, and wherein the set of TCIs is a single configured grouping of TCIs or a group of TCIs, selected from a plurality of configured groupings of TCIs, with a common attribute.

8. The method of claim 1, wherein the TCI includes a downlink TCI and an uplink TCI.

9. The method of claim 1, wherein the TCI is based on at least one of:
   a radio network temporary identifier (RNTI) associated with the DCI,
   a mandatory field of the DCI,
   a validation sequence configured for beam indication, or
   a value of a validation sequence associated with a non-TCI configuration.

10. The method of claim 1, wherein a configured field associated with the TCI is not present in the one or more configured fields of the DCI, and wherein the UE is configured to determine the TCI based on at least one of:
   another DCI,
   another indicator that is not a DCI,
   another configured field that is present in the one or more configured fields of the DCI, or a default configuration.

11. A method of wireless communication performed by an apparatus of a base station (BS), comprising:
   receiving a capability indication indicating whether a user equipment (UE) supports a downlink control information (DCI) format without a downlink assignment and indicating whether the UE supports another DCI format with a downlink assignment;
   transmitting DCI having the DCI format, wherein the DCI includes one or more configured fields, and wherein the DCI does not include scheduling data; and
   communicating in accordance with a transmission configuration indicator (TCI) associated with the one or more configured fields.

12. The method of claim 11, wherein the DCI format is DCI format 11 or DCI format 12, and wherein the DCI includes an indication of the TCI and does not include another type of indication.

13. The method of claim 11, wherein the DCI format is a DCI format 1_0 or an uplink DCI format, and wherein the DCI includes a first indication of the TCI and a second indication of another setting.

14. The method of claim 13, wherein the second indication includes at least one of:
   a secondary cell (SCell) dormancy indication,
   a semi-persistent scheduling (SPS) release indication, an SPS activation indication, or
   a hybrid automatic repeat request (HARQ) indication.

15. The method of claim 11, wherein the TCI is based on a value for a TCI field parameter of the DCI, a value for a non-TCI field parameter of the DCI, or one or more control resource set (CORESET) beams of the DCI.

16. The method of claim 11, wherein the DCI indicates a plurality of TCIs or a single TCI associated with a TCI pool from which to configure the plurality of TCIs.

17. The method of claim 11, wherein the DCI includes a TCI field indicating an identifier of a set of TCIs, and wherein the set of TCIs is a single configured grouping of TCIs or a group of TCIs, selected from a plurality of configured groupings of TCIs, with a common attribute.

18. The method of claim 11, wherein the TCI includes a downlink TCI and an uplink TCI.

19. The method of claim 11, wherein the TCI is based on at least one of: a radio network temporary identifier (RNTI) associated with the DCI,
   a mandatory field of the DCI,
   a validation sequence configured for beam indication, or
   a value of a validation sequence associated with a non-TCI configuration.

20. A method of wireless communication performed by an apparatus of a user equipment (UE), comprising:

transmitting a capability indicator, wherein the capability indicator is associated with whether the UE supports downlink control information (DCI) having a DCI format, wherein the DCI format includes one or more configured fields, wherein the DCI format does not include scheduling data, and wherein at least one of:

the capability indicator is included in an optional field of an uplink control information (UCI) message, or the capability indicator is a single capability indicator indicating support for the DCI format not including scheduling data and for another DCI format including scheduling data; and communicating in accordance with the capability indicator.

21. The method of claim 20, wherein the one or more configured fields are associated with a transmission configuration indicator (TCI).

22. The method of claim 20, wherein the capability indicator identifies UE support for the DCI having the DCI format.

23. The method of claim 22, further comprising:

receiving the DCI having the DCI format, and wherein communicating in accordance with the capability indicator comprises:

communicating in accordance with a transmission configuration indicator (TCI) associated with the one or more configured fields.

24. The method of claim 20, wherein the capability indicator is included in the optional field of the UCI message.

25. The method of claim 20, wherein the capability indicator is the single capability indicator indicating support for the DCI format not including scheduling data and for the other DCI format including scheduling data.

26. The method of claim 20, wherein the capability indicator is a first capability indicator indicating support for the DCI format not including scheduling data.

27. The method of claim 26, further comprising:

transmitting a second capability indicator indicating support for the other DCI format including scheduling data; and wherein communicating in accordance with the capability indicator comprises:

communicating in accordance with the first capability indicator and the second capability indicator.

28. A method of wireless communication performed by an apparatus of a base station (BS), comprising:

receiving a capability indicator, wherein the capability indicator is associated with whether a user equipment (UE) supports downlink control information (DCI) having a DCI format, wherein the DCI format includes one or more configured fields, wherein the DCI format does not include scheduling data, and wherein at least one of:

the capability indicator is included in an optional field of an uplink control information (UCI) message, or the capability indicator is a single capability indicator indicating support for the DCI format not including scheduling data and for another DCI format including scheduling data; and communicating in accordance with the capability indicator.

29. The method of claim 28, wherein the one or more configured fields are associated with a transmission configuration indicator (TCI).

30. The method of claim 28, wherein the capability indicator identifies UE support for the DCI having the DCI format.

31. The method of claim 30, further comprising:

transmitting the DCI having the DCI format, and wherein communicating in accordance with the capability indicator comprises:

communicating in accordance with a transmission configuration indicator (TCI) associated with the one or more configured fields.

32. The method of claim 28, wherein the capability indicator is included in the optional field of the UCI message.

33. The method of claim 28, wherein the capability indicator is the single capability indicator indicating support for the DCI format not including scheduling data and for the other DCI format including scheduling data.

34. The method of claim 28, wherein the capability indicator is a first capability indicator indicating support for the DCI format not including scheduling data.

35. The method of claim 34, further comprising:

receiving a second capability indicator indicating support for the other DCI format including scheduling data; and wherein communicating in accordance with the capability indicator comprises:

communicating in accordance with the first capability indicator and the second capability indicator.

* * * * *